United States Patent
Babaei et al.

(10) Patent No.: US 11,683,216 B2
(45) Date of Patent: Jun. 20, 2023

(54) BEAM FAILURE RECOVERY IN UNLICENSED CELLS

(71) Applicant: Beijing Xiaomi Mobile Software Co., Ltd., Beijing (CN)

(72) Inventors: Alireza Babaei, Fairfax, VA (US); Esmael Hejazi Dinan, McLean, VA (US); Ali Cagatay Cirik, Herndon, VA (US); Hua Zhou, Herndon, VA (US); Hyoungsuk Jeon, Centreville, VA (US); Kyungmin Park, Vienna, VA (US)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 16 days.

(21) Appl. No.: 17/170,317

(22) Filed: Feb. 8, 2021

(65) Prior Publication Data
US 2021/0194756 A1 Jun. 24, 2021

Related U.S. Application Data

(63) Continuation of application No. PCT/US2019/045305, filed on Aug. 6, 2019.

(60) Provisional application No. 62/716,010, filed on Aug. 8, 2018.

(51) Int. Cl.
*H04L 12/24* (2006.01)
*H04W 74/08* (2009.01)
*H04L 41/0654* (2022.01)
*H04L 5/00* (2006.01)

(52) U.S. Cl.
CPC ..... *H04L 41/0654* (2013.01); *H04W 74/0808* (2013.01); *H04L 5/0048* (2013.01)

(58) Field of Classification Search
CPC ... H04B 7/0695; H04B 7/088; H04L 41/0654; H04L 5/0048; H04W 72/046; H04W 74/0808; H04W 74/0833
See application file for complete search history.

(56) References Cited

U.S. PATENT DOCUMENTS

2017/0238334 A1* 8/2017 Yang ................ H04W 74/0808
370/336

FOREIGN PATENT DOCUMENTS

| WO | 2017092810 A1 | 6/2017 | |
|---|---|---|---|
| WO | 2018083624 | 5/2018 | |
| WO | WO-2018083624 A1 * | 5/2018 | ............. H04B 7/022 |

OTHER PUBLICATIONS

International Search Report dated Feb. 5, 2020 for International Application No. PCT/US2019/045305.

(Continued)

*Primary Examiner* — Melvin C Marcelo
*Assistant Examiner* — Natali Pascual Peguero
(74) *Attorney, Agent, or Firm* — Arch & Lake LLP

(57) ABSTRACT

A wireless device receives configuration parameters indicating a first value of a beam failure instance counter and a radio resource of a downlink signal. The wireless device determines the downlink signal is transmitted via the radio resource. The wireless device determines a beam failure instance based on: the determining the downlink signal is transmitted; and a received power of the downlink signal being less than a threshold value. The wireless device increments the beam failure instance counter based on the determining the beam failure instance.

20 Claims, 26 Drawing Sheets

(56) References Cited

OTHER PUBLICATIONS

R2-1810778; 3GPP TSG-RAN WG2 NR AH 1807; Montreal, QC, Canada, Jul. 2-6, 2018; Title: Miscellanous corrections; Source to WG: Samsung; Source to TSG: RAN2.
3GPP TS 38.211 V15.2.0 (Jun. 2018); Technical Specification; 3rd Generation Partnership Project; Technical Specification Group Radio Access Network; NR; Physical channels and modulation; (Release 15).
3GPP TS 38.212 V15.2.0 (Jun. 2018); Technical Specification; 3rd Generation Partnership Project; Technical Specification Group Radio Access Network; NR; Multiplexing and channel coding; (Release 15).
3GPP TS 38.213 V15.2.0 (Jun. 2018); Technical Specification; 3rd Generation Partnership Project; Technical Specification Group Radio Access Network; NR;Physical layer procedures for control (Release 15).
3GPP TS 38.214 V15.2.0 (Jun. 2018); Technical Specification; 3rd Generation Partnership Project; Technical Specification Group Radio Access Network; NR;Physical layer procedures for data (Release 15).
3GPP TS 38.300 V15.2.0 (Jun. 2018); Technical Specification; 3rd Generation Partnership Project; Technical Specification Group Radio Access Network; NR; NR and NG-RAN Overall Description; Stage 2; (Release 15).
3GPP TS 38.321 V15.2.0 (Jun. 2018); Technical Specification; 3rd Generation Partnership Project; Technical Specification Group Radio Access Network; NR; Medium Access Control (MAC) protocol specification; (Release 15).
3GPP TS 38.331 V15.2.1 (Jun. 2018); Technical Specification; 3rd Generation Partnership Project; Technical Specification Group Radio Access Network; NR; Radio Resource Control (RRC) protocol specification; (Release 15).
R1-1805919; 3GPP TSG RAN WG1 Meeting #93; Busan, Korea, May 21-May 25, 2018; Agenda Item:7.6.4.1; Source:Huawei, HiSilicon; Title:Coexistence and channel access for NR unlicensed band operations.
R1-1806106_DL Signals and Channels; 3GPP TSG RAN WG1 Meeting #93; Busan, Korea, May 21-25, 2018; Agenda item:7.6.3.1; Source:Nokia, Nokia Shanghai Bell; Title:On DL Signals and Channels for NR-U.
R1-1806315_NR-U_DL_Channel; 3GPP TSG RAN WG1 Meeting #93; Busan, Korea, May 21-25, 2018; Source: CATT; Title: DL Physical Channel and Signal Design for NR-U Operations; Agenda Item: 7.6.3.1.
R1-1806410_Discussion on SS_PBCH block in NR-U operation_final; 3GPP TSG RAN WG1 Meeting #93; Busan, Korea, May 21-25, 2018; Agenda Item:7.6.1.3; Source:Spreadtrum Communications; Title:Discussion on SS/PBCH block in NR-U operation.
R1-1806412; 3GPP TSG RAN WG1 Meeting #93; Busan, Korea, May 21-25, 2018; Agenda Item:7.6.4.1; Source: Spreadtrum Communications; Title:Considerations on the channel access procedures for NR-U.
R1-1806460 Considerations on DL reference signals and channels design for NR-U; 3GPP TSG RAN WG1 Meeting #93; Busan, Korea, May 21-25, 2018; Title: Considerations on DL reference signals and channels design for NR-U; Source: ZTE; Agenda Item:7.6.3.1.
R1-1806856; GPP TSG RAN WG1 Meeting #93; Busan, Korea, May 21-25, 2018; Source:OPPO; Title:SS/PBCH block transmission on NR-U; Agenda Item:7.6.4.5.
R1-1806968 (R15 NR WI AI 7645—BWP for NR-U); 3GPP RAN WG1 Meeting #93; Busan, Korea, May 21-25, 2018(Update to R1-1804680); Agenda Item:7.6.4.5; Source:InterDigital Inc.; Title:BWP operation in unlicensed spectrum; Document for:Discussion.
R1-1807002 NR Unlicensed physical channel design considerations considerations; 3GPP TSG RAN WG1 Meeting #93; Busan, Korea, May 21-25, 2018; Agenda Item:7.6.3.2; Source:Apple Inc.; Title:NR Unlicensed Physical Channel Design Considerations.
R1-1807208; 3GPP TSG RAN WG1 Meeting #93; Busan, Korea, May 21-25, 2018; Agenda Item:7.6.3.1; Source: Xiaomi Communications; Title: SS/PBCH blocks transmission for NR unlicensed.
R2-1806886_Report_Email_Discussion_NRU; 3GPP TSG-RAN WG2 Meeting #102; Busan, Korea, May 21-25, 2018 Agenda item:11.2 (TBC); Source: Qualcomm Incorporated; Title: Report of Email Discussion [101bis#49][NR] NR unlicensed SI (Qualcomm).
R2-1809788-RACHupdate-NRu_v00; 3GPP TSG-RAN WG2 NR AdHoc #1807; Montreal, Canada, Jul. 2-6, 2018 (Revision of R2-1807355); Agenda Item:11.2; Source: Intel Corporation; Title: Random access procedure for NR-u.
R2-1809918 Random Access Procedure for NR-U Operation; 3GPP TSG-RAN WG2 Meeting #NR AdHoc; Montreal, Jul. 2-6, 2018; Agenda Item:11.2; Source:Samsung; Title:Random Access Procedure for NR-U Operation Document for:Discussion.
R2-1810232 NR-U RRM & connected mode mobility; 3GPP TSG-RAN WG2 Meeting #AH-1807; Montreal, Canada, Jul. 2-6, 2018; Agenda item:11.2; Source: Nokia, Nokia Shanghai Bell.
R2-1810323_Report_Email_Discussion_NRU_Mobiliy; 3GPPTSG-RAN2 NR AH#0218R2-1810323; Montreal, Canada, Jul. 2-6, 2018; Agenda item:11.2; Source: Qualcomm Incorporated.
R2-1810400—Connected mode mobility framework in NR-U; 3GPP TSG-RAN WG2 AH 1807TDoc; Montreal, Canada, Jul. 2-6, 2018(Revision of R2-1805732); Agenda Item: 11.2; Source:Ericsson; Title:Connected mode mobility in NR-U.
European Office Action, dated Jun. 25, 2021, in European Patent Application No. 19759123.3.

* cited by examiner

| Channel Access Priority Class ($p$) | QCI |
|---|---|
| 1 | 1, 3, 5, 65, 66, 69, 70 |
| 2 | 2, 7 |
| 3 | 4, 6, 8, 9 |
| 4 | - |

FIG. 16

BEAM FAILURE RECOVERY IN UNLICENSED CELLS

CROSS-REFERENCE TO RELATED APPLICATIONS

This application is a continuation of International Application No. PCT/US2019/045305, filed Aug. 6, 2019, which claims the benefit of U.S. Provisional Application No. 62/716,010, filed Aug. 8, 2018, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 16 is an example channel access priority to QCI mapping as per an aspect of an embodiment of the present disclosure.

DETAILED DESCRIPTION OF EMBODIMENTS

Figure 1:
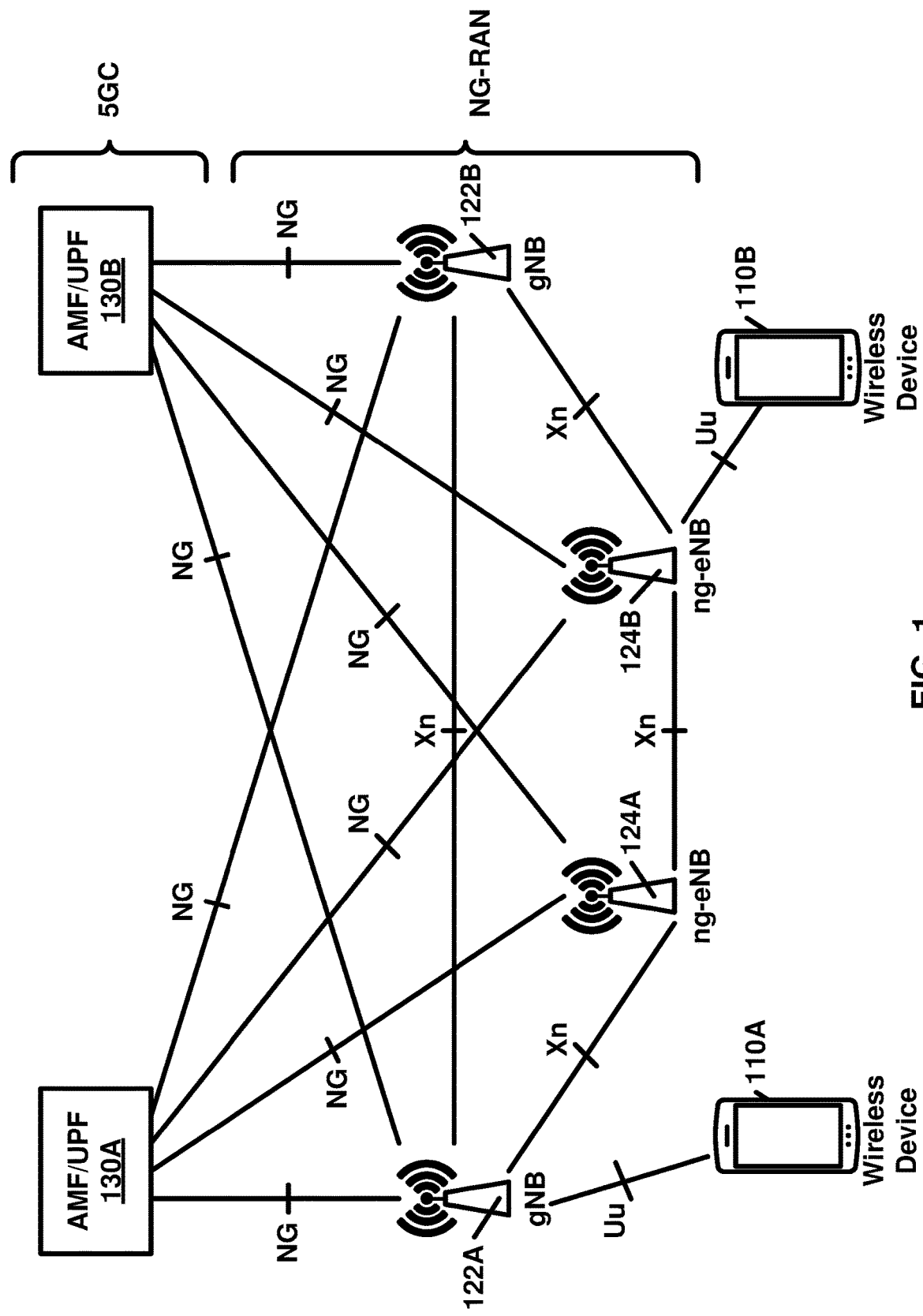
FIG. 1 is a diagram of an example RAN architecture as per an aspect of an embodiment of the present disclosure.

Example embodiments of the present disclosure enable operation of beam failure recovery in unlicensed bands. Embodiments of the technology disclosed herein may be employed in the technical field of multicarrier communication systems. More particularly, the embodiments of the technology disclosed herein may relate to beam failure recovery in multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
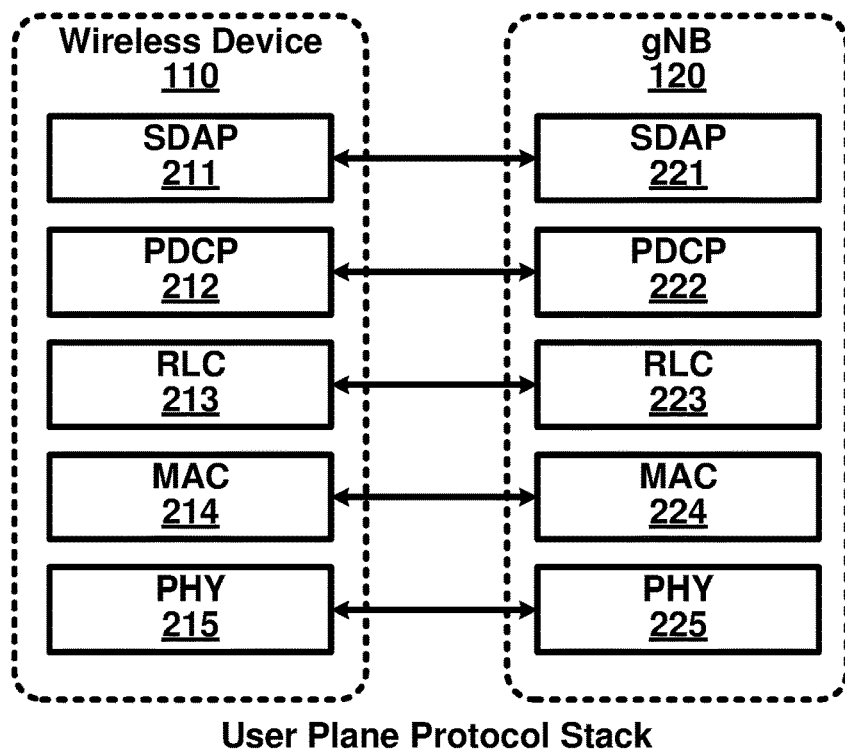
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
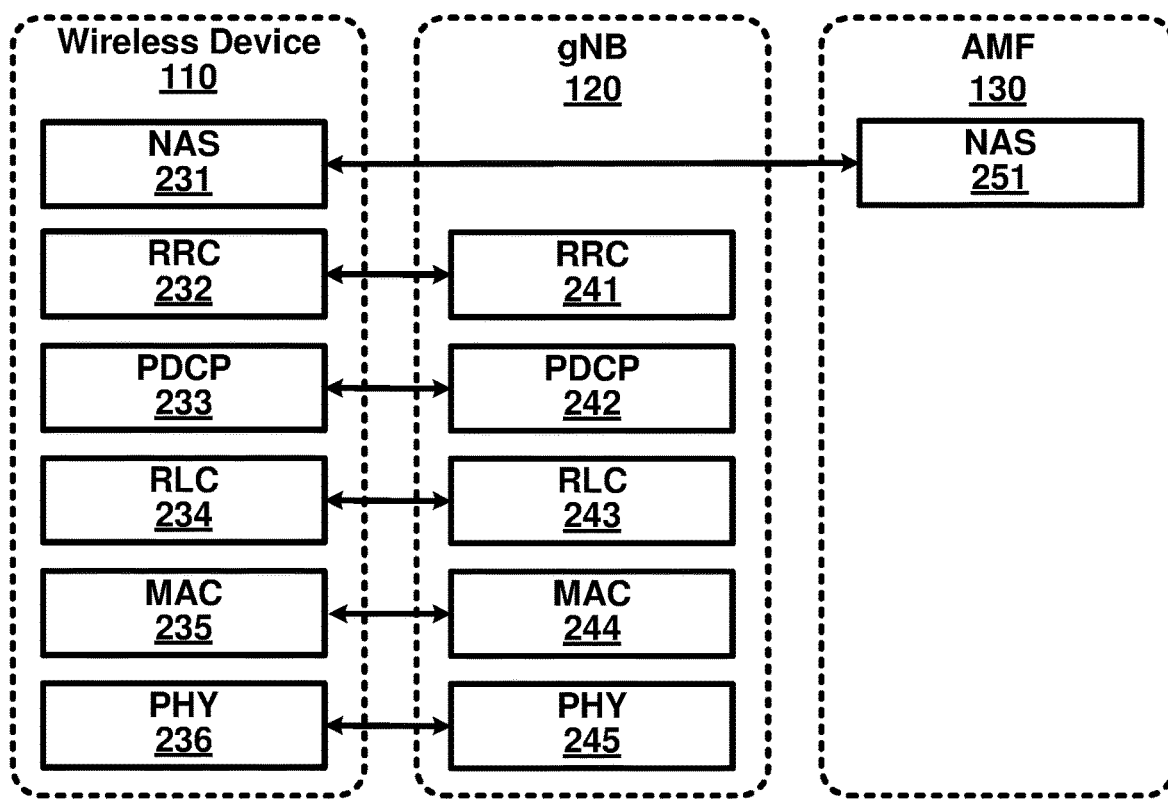
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
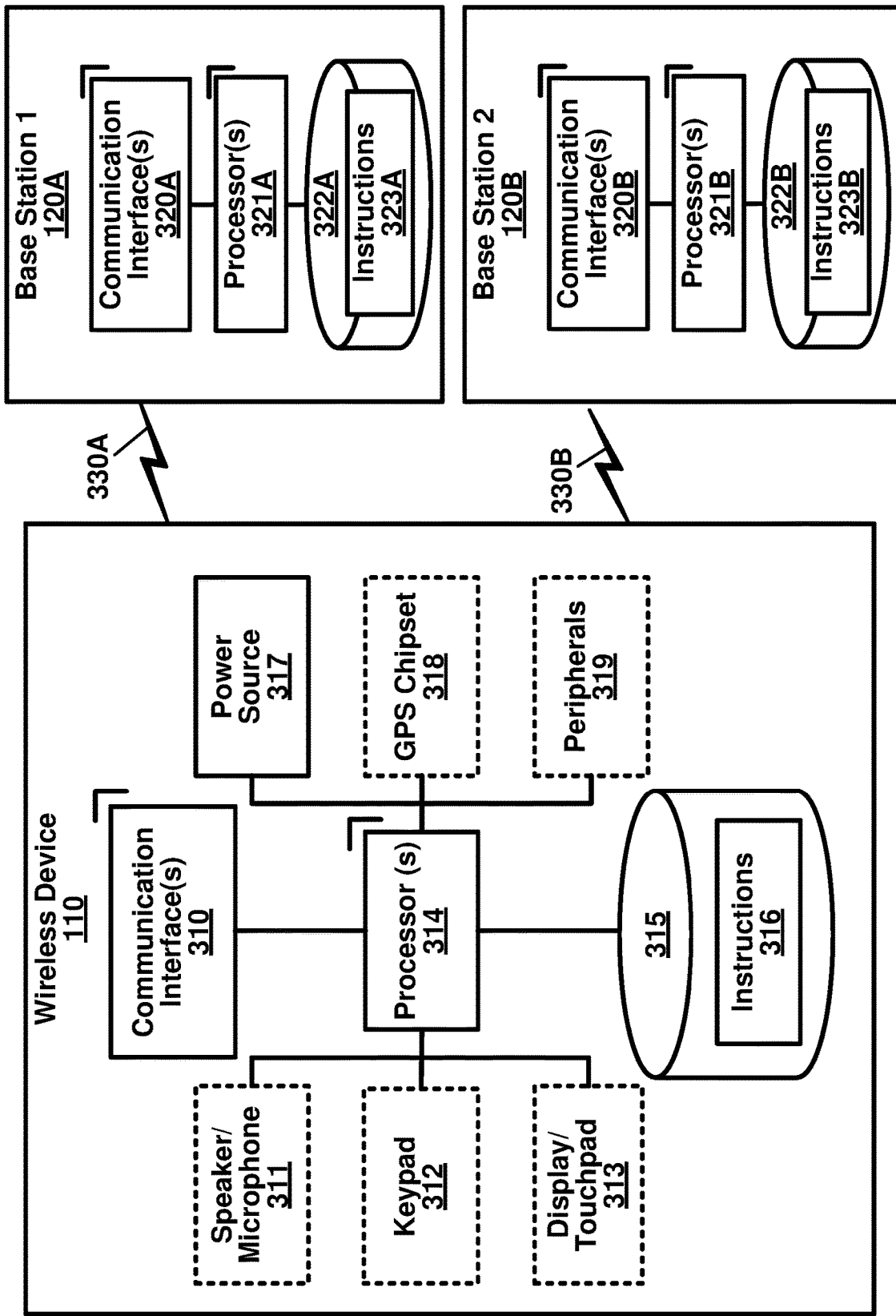
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
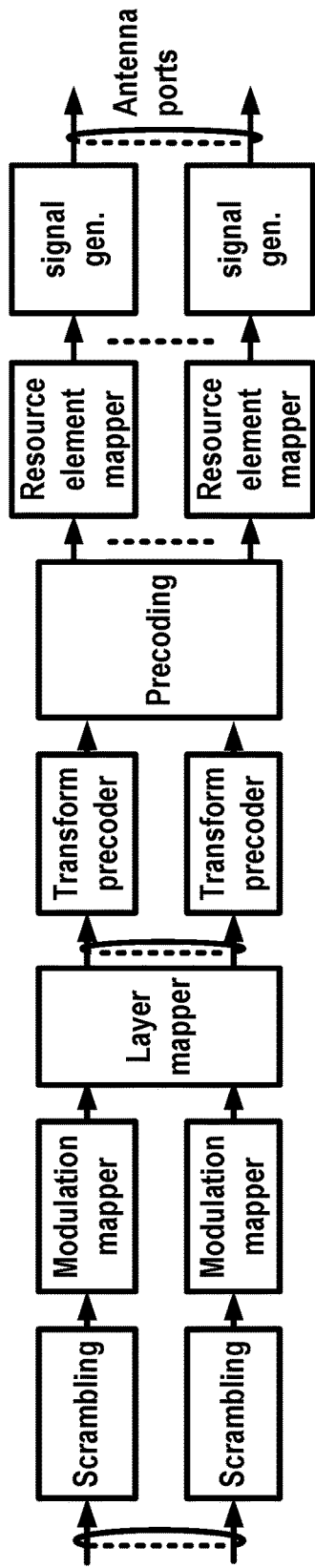
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4D:
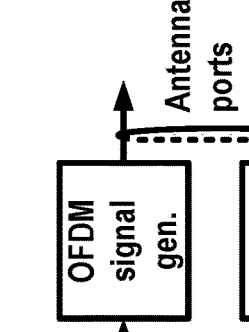
Figure 4B:
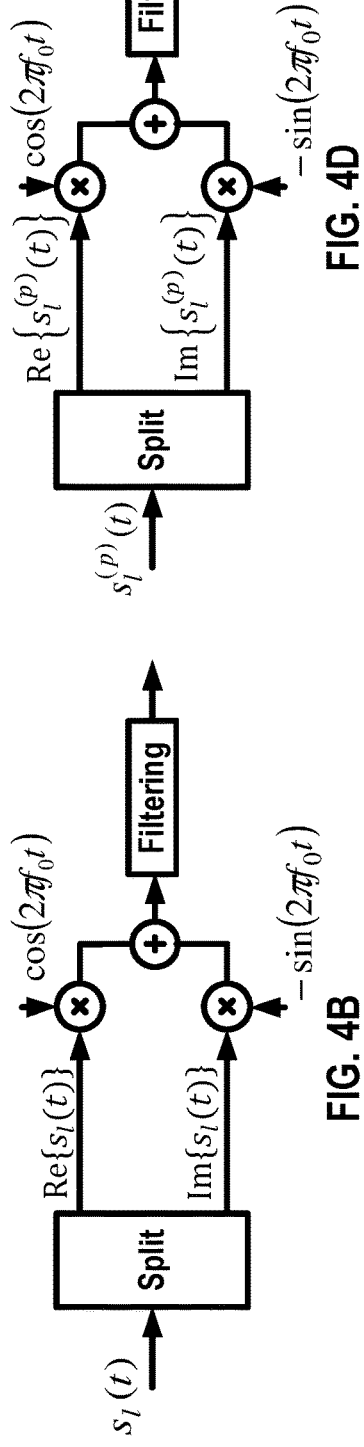

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4C:
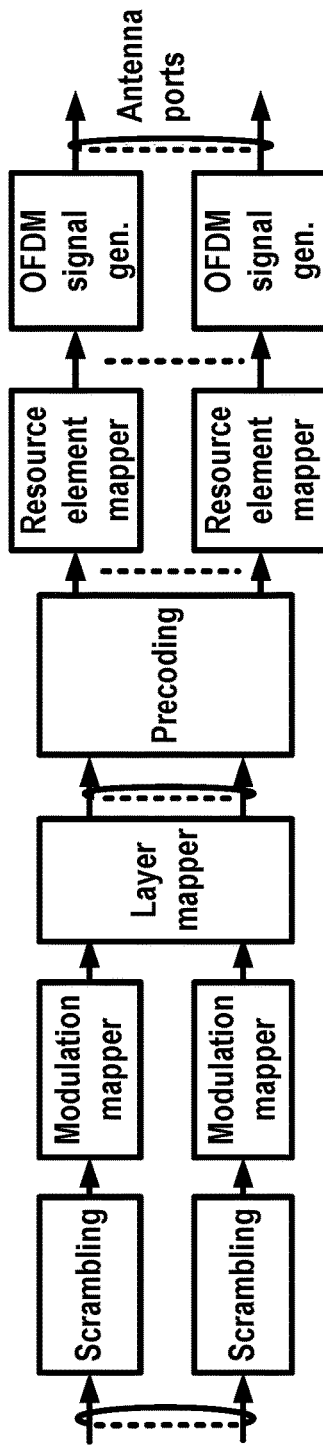

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
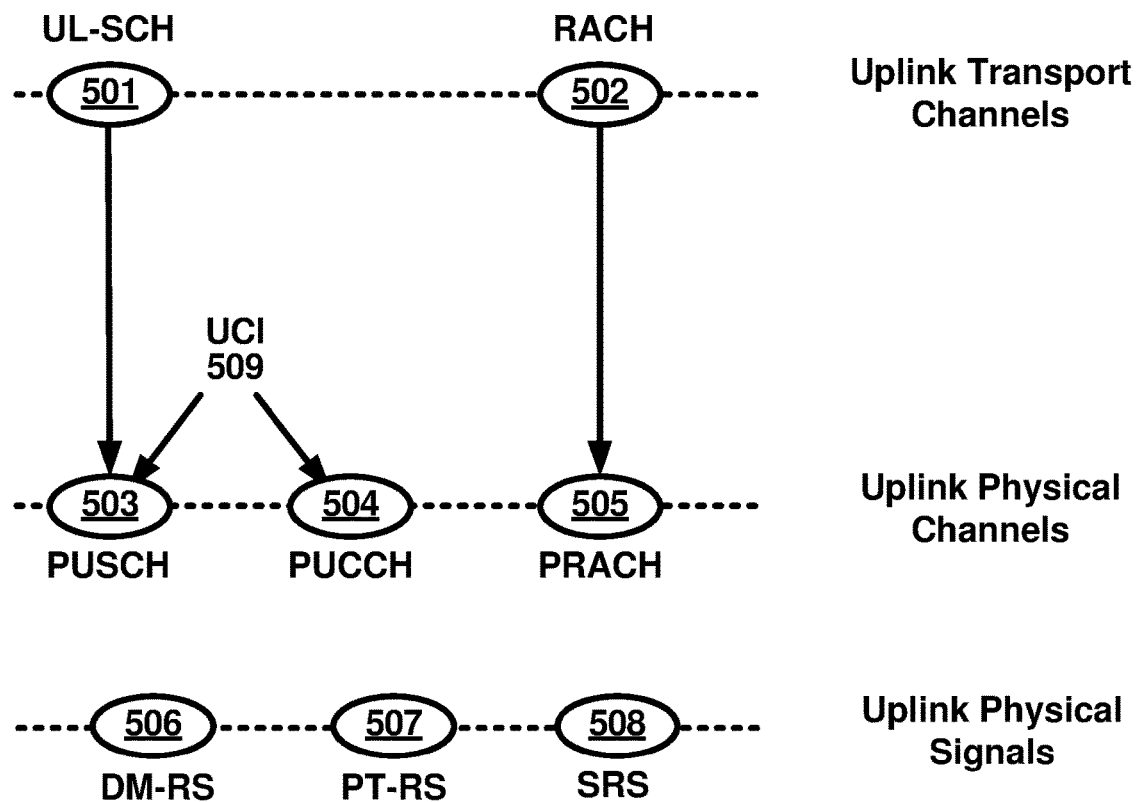
FIG. 5A is a diagram of an example uplink channel mapping and example uplink physical signals as per an aspect of an embodiment of the present disclosure.
Figure 5B:
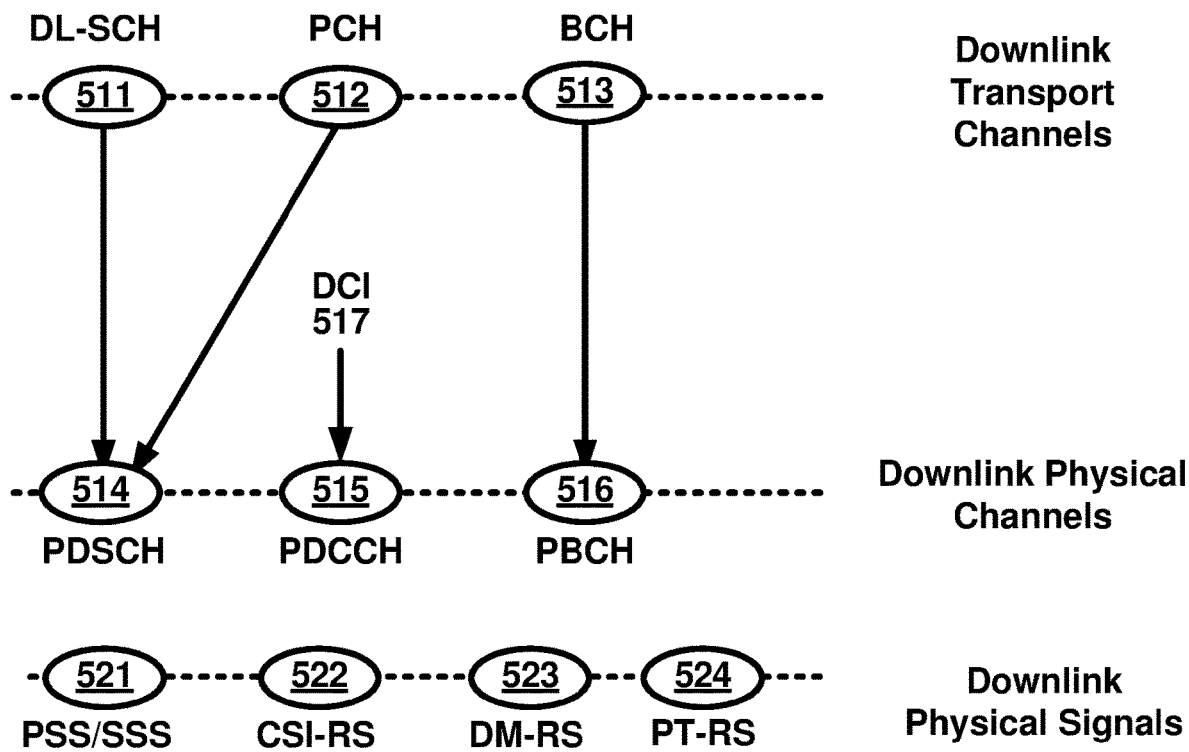
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
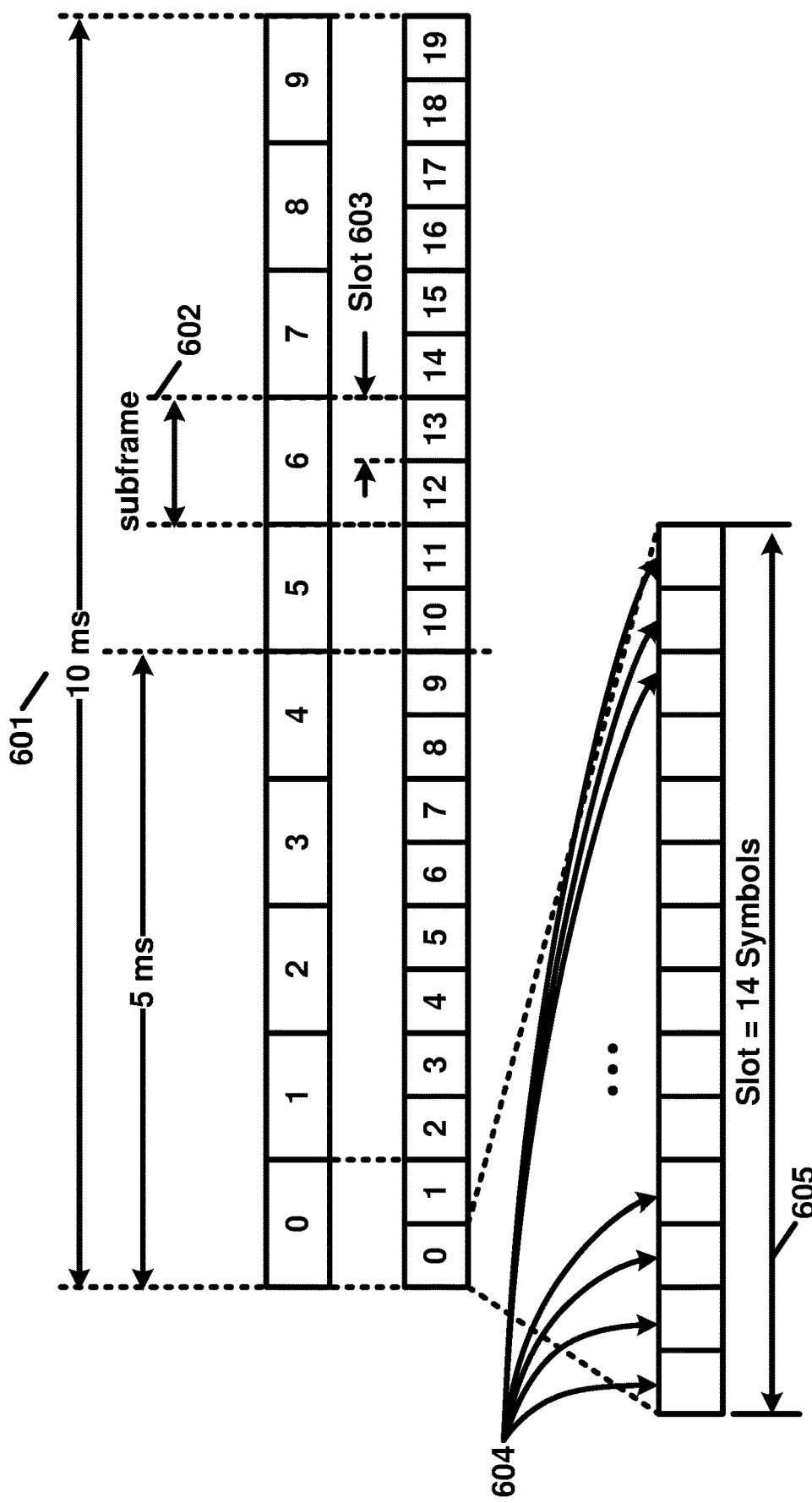
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
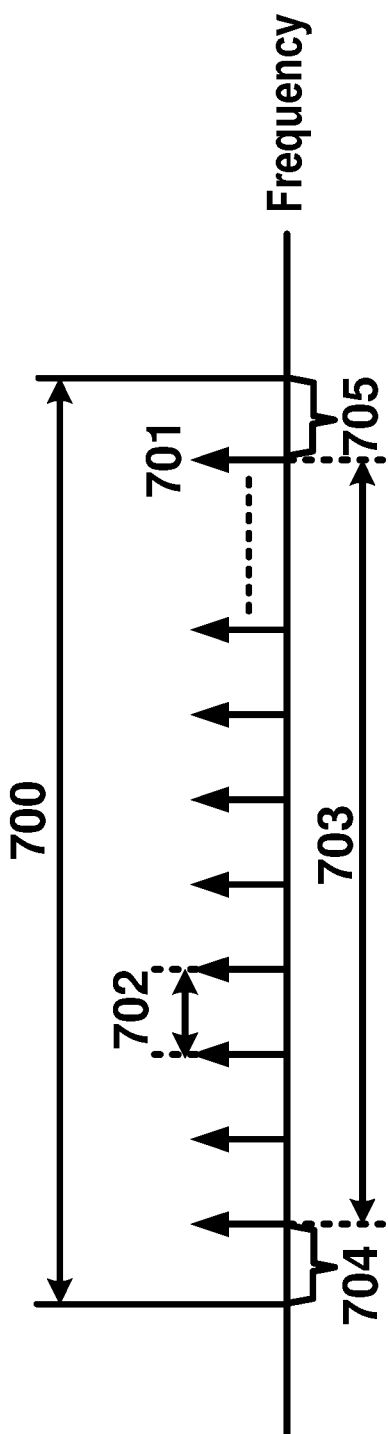
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
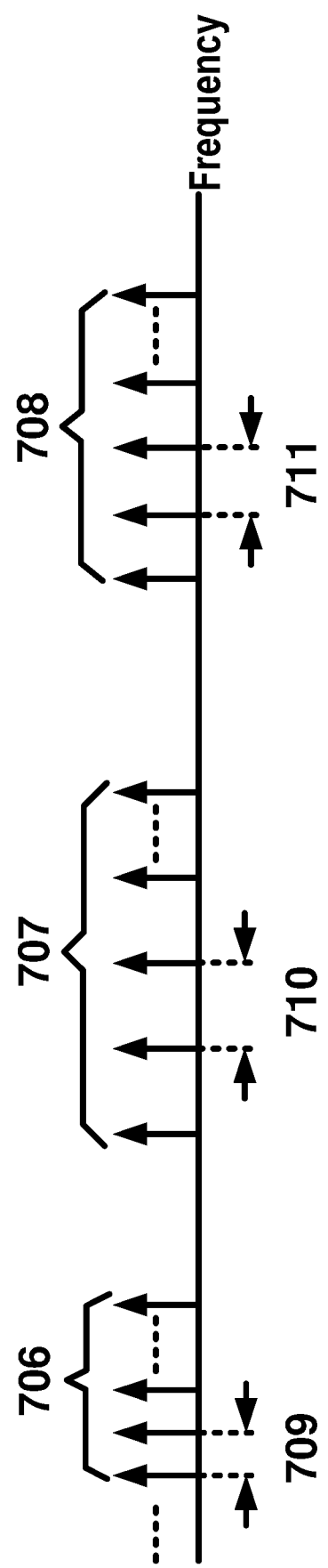

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
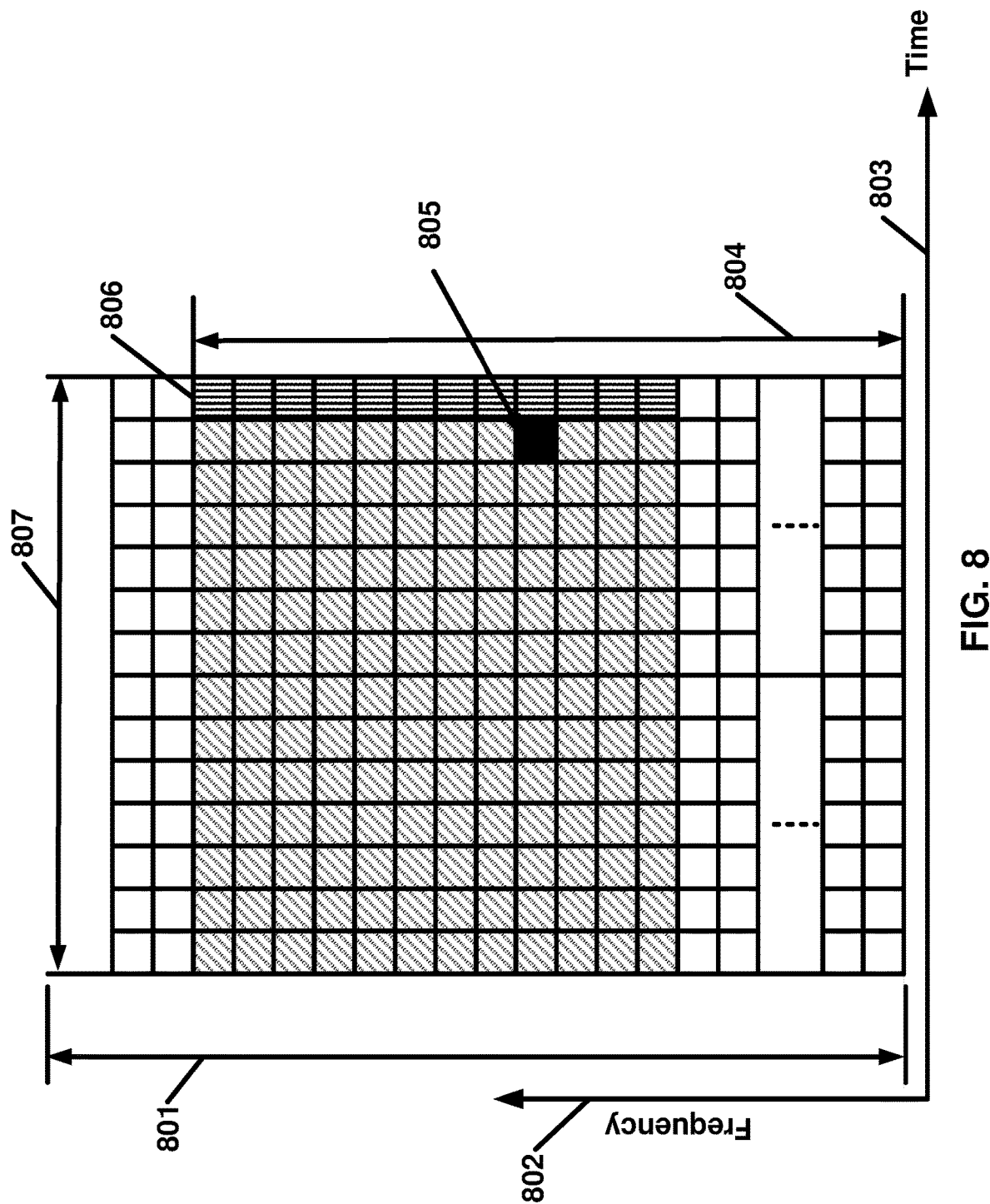
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
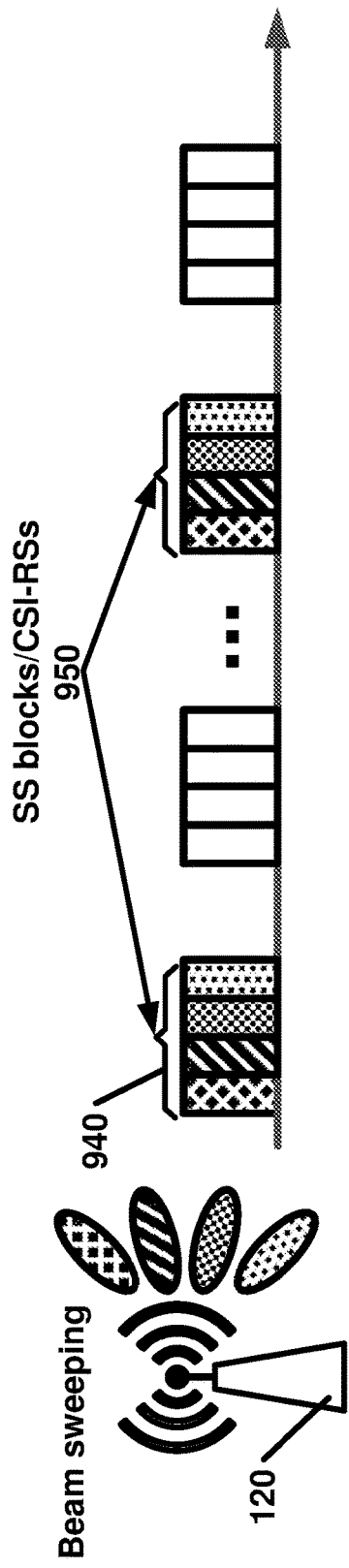
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
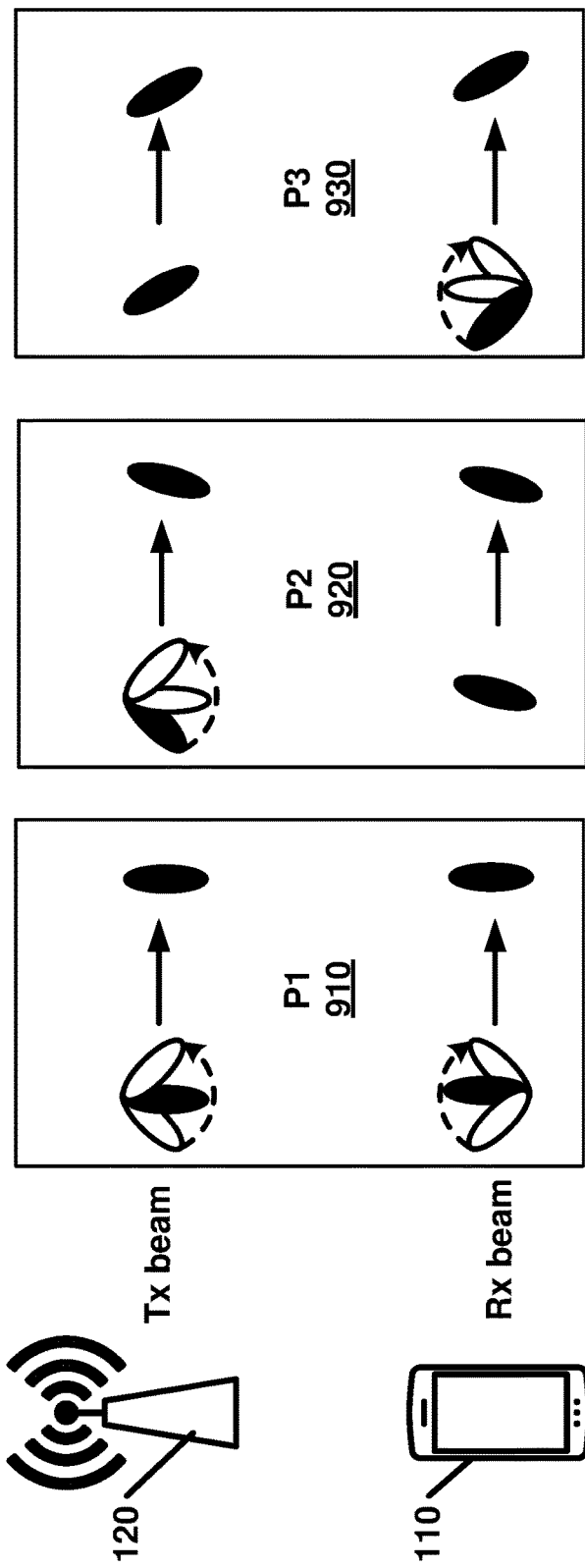
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
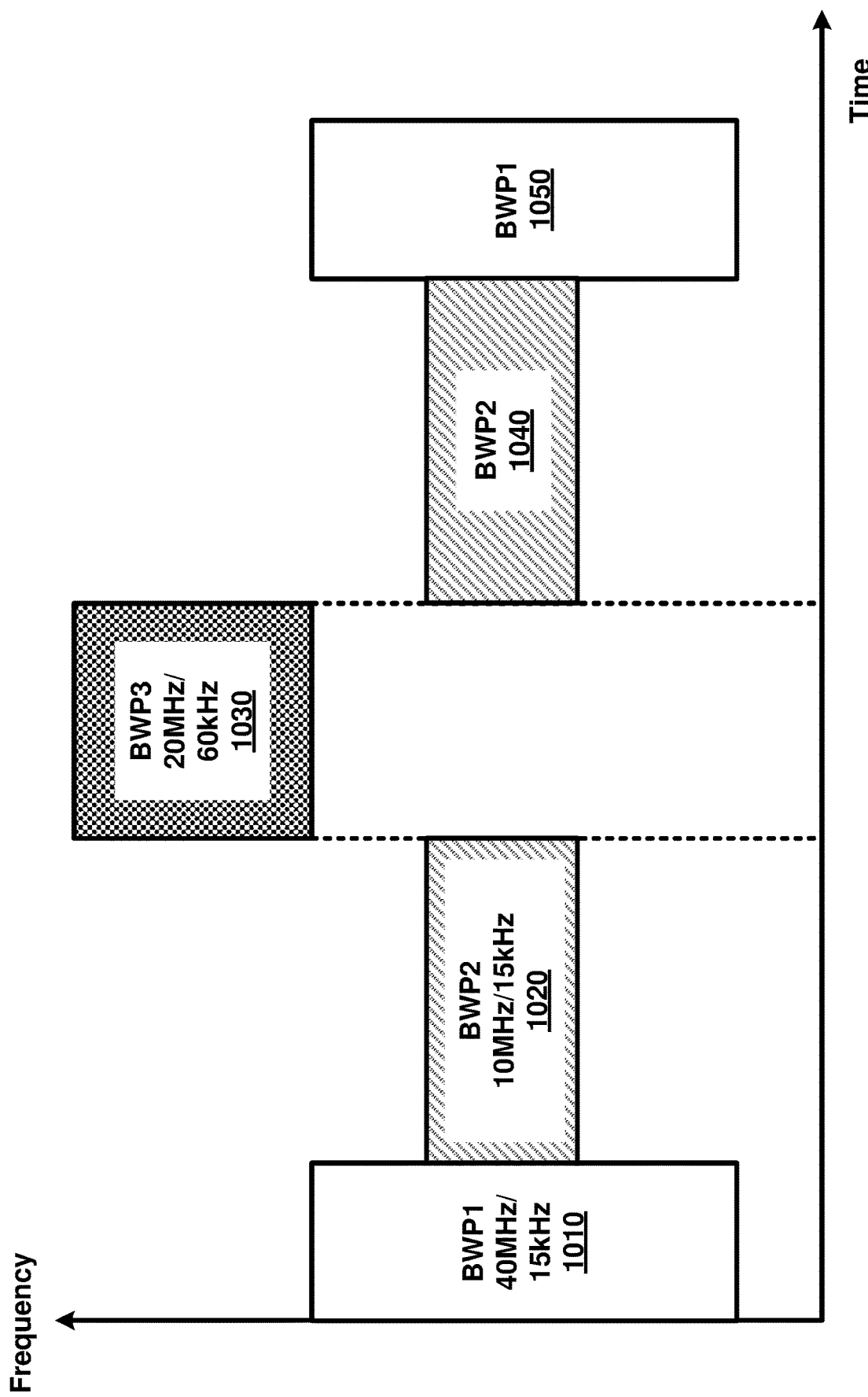
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
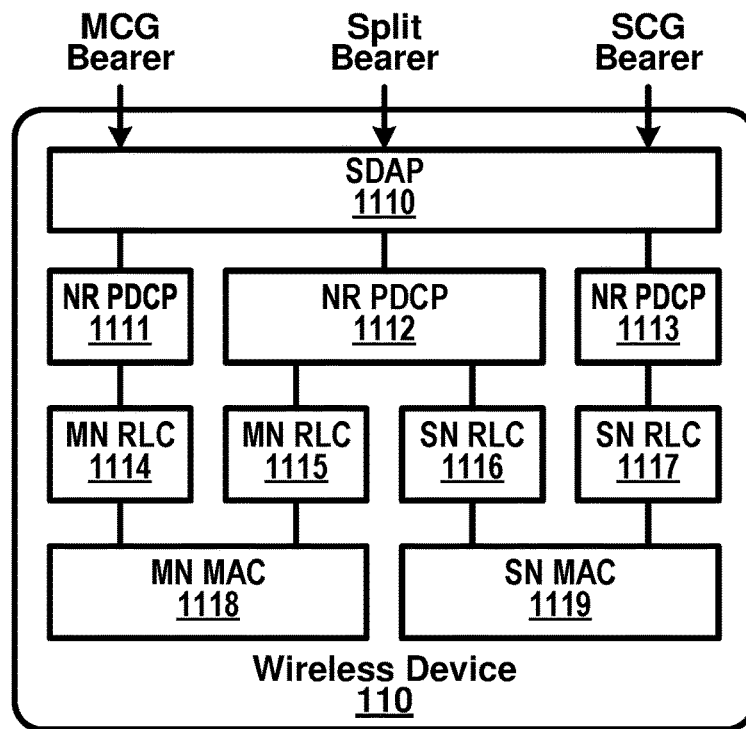
FIG. 11A, and FIG. 11B are diagrams of an example multi connectivity as per an aspect of an embodiment of the present disclosure.
Figure 11B:
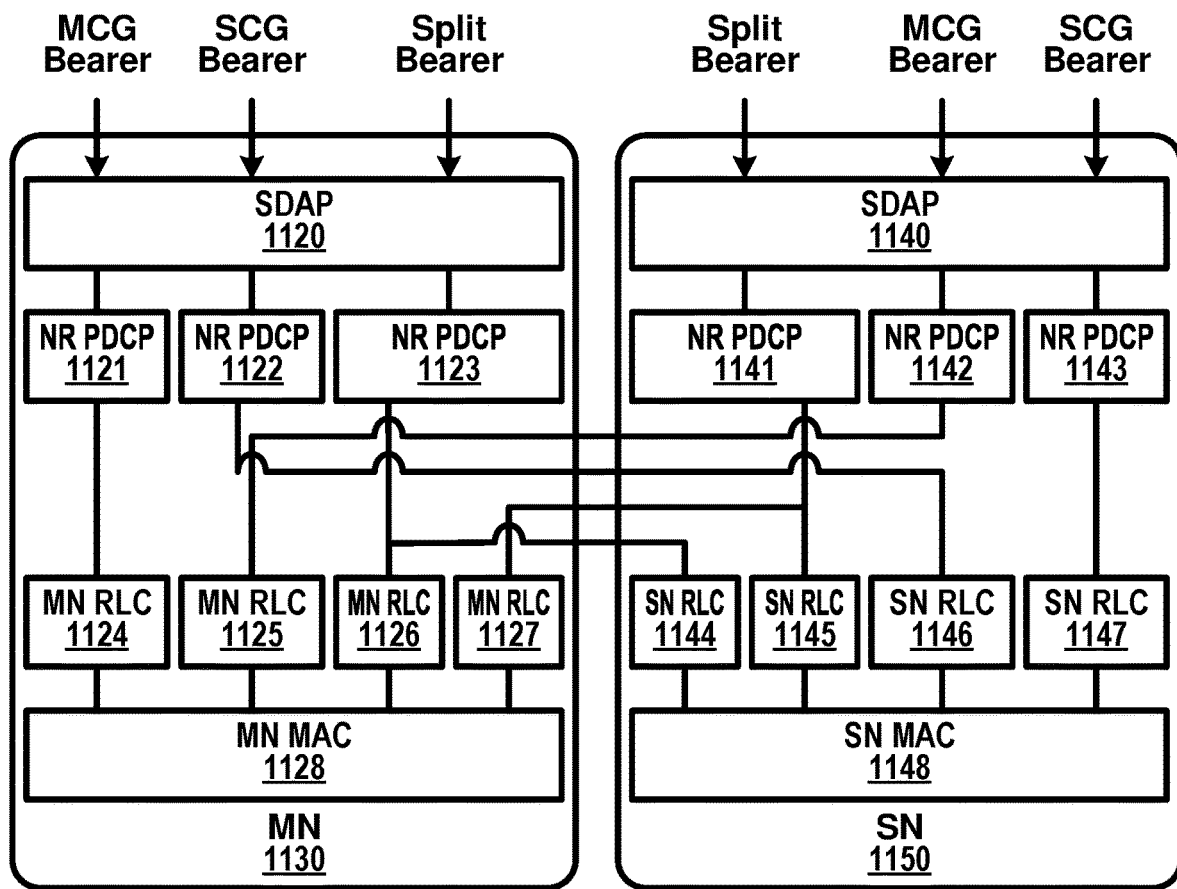

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
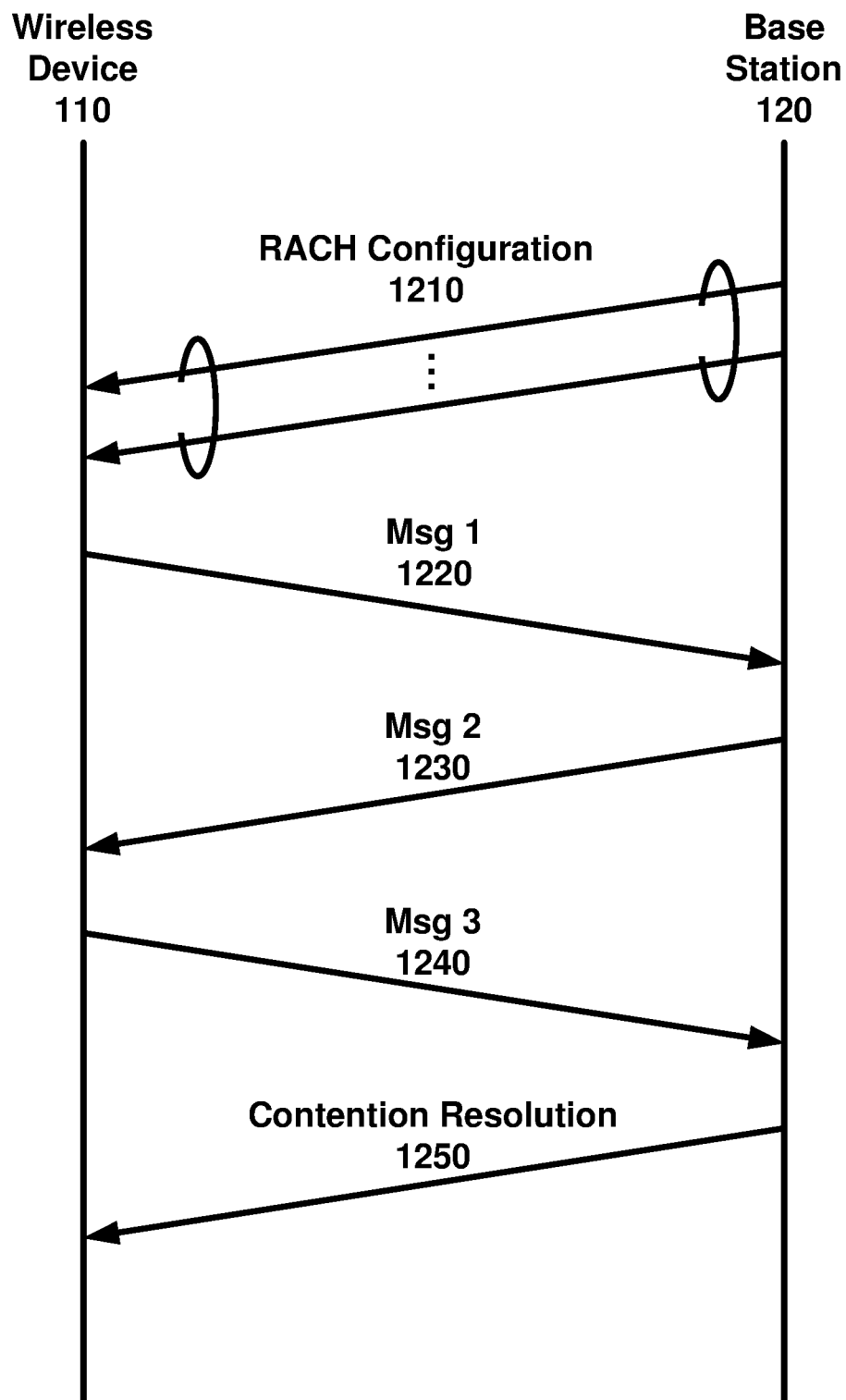
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
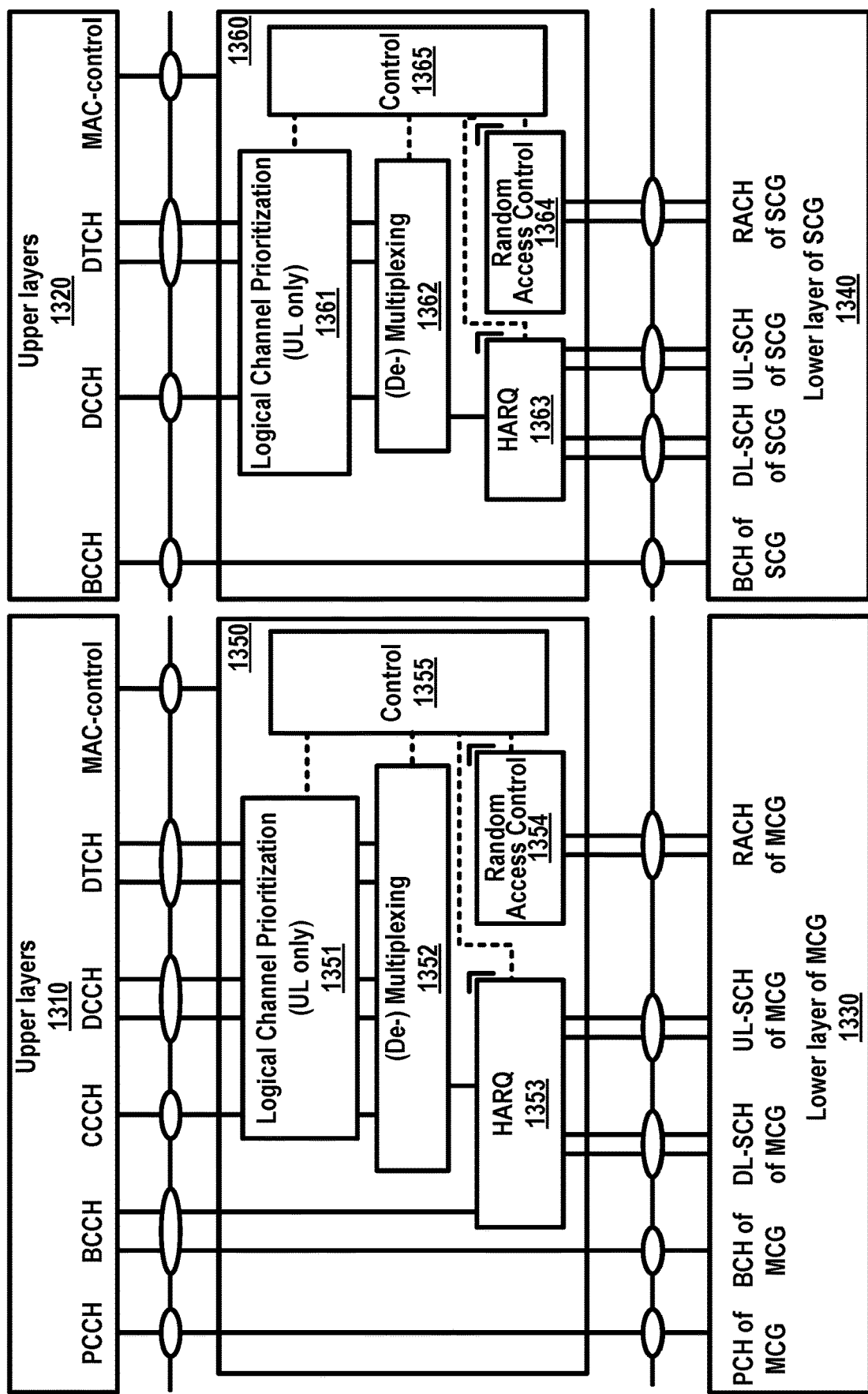
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
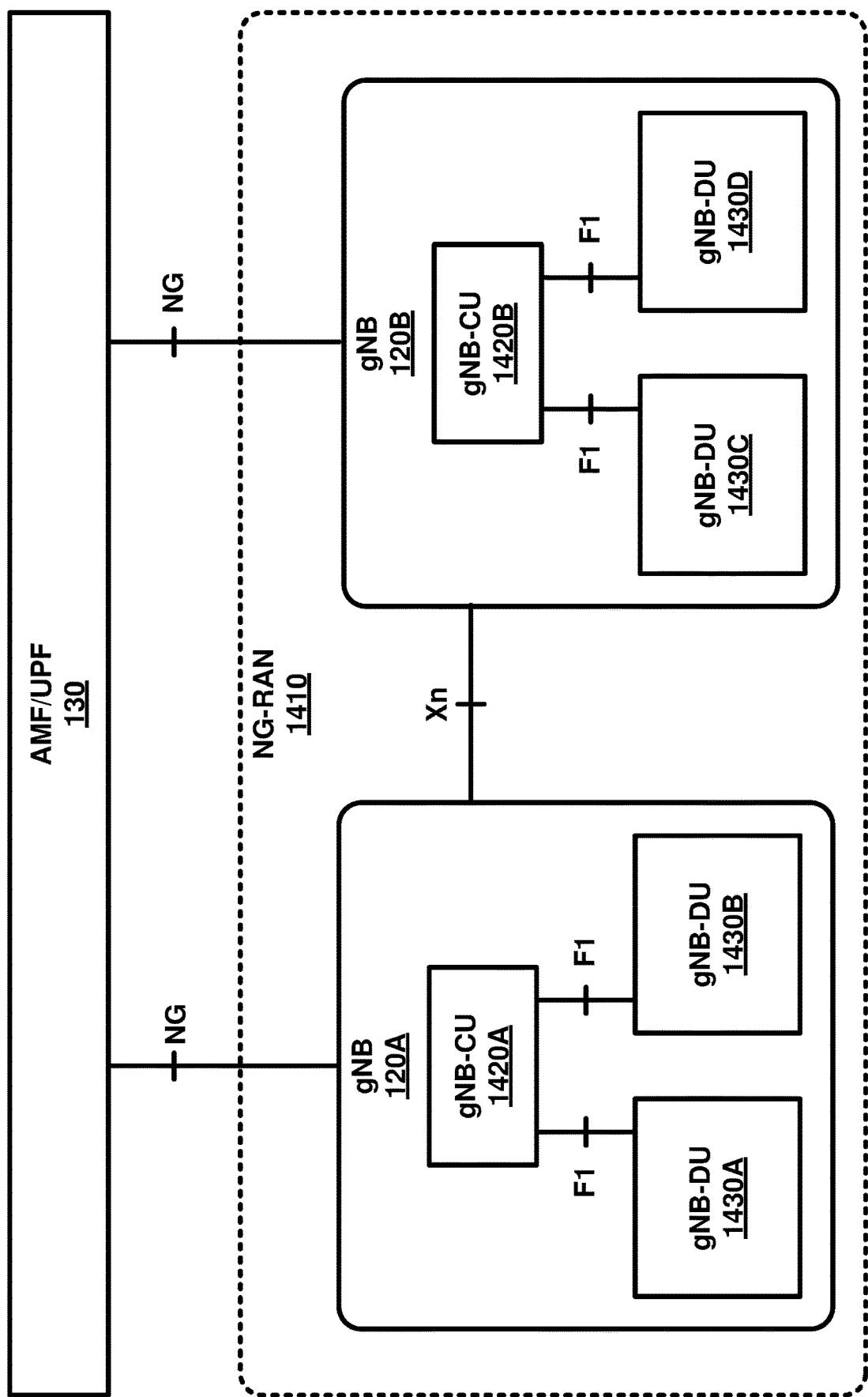
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
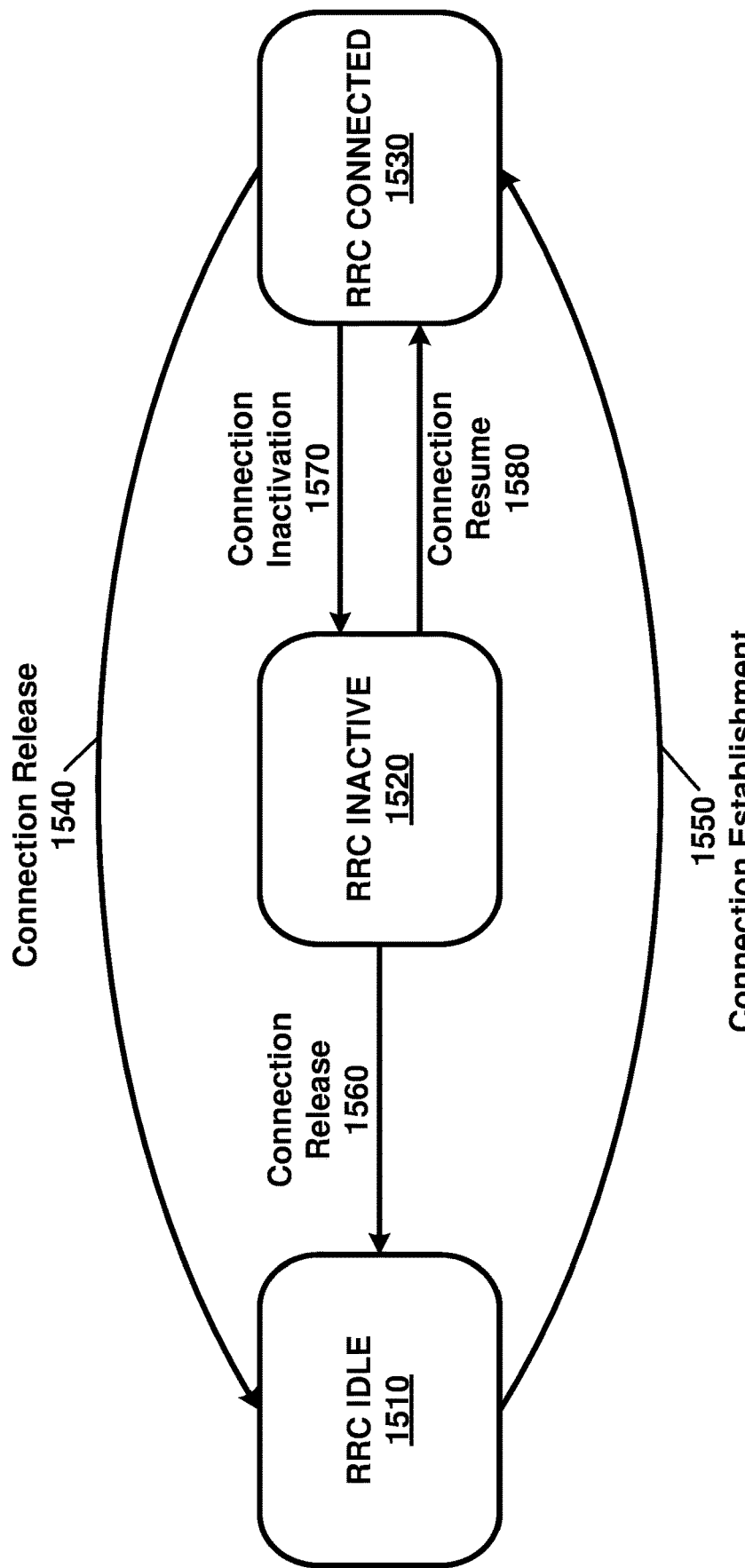
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, single and multiple DL to UL and UL to DL switching within a shared gNB COT may be supported. Example LBT requirements to support single or multiple switching points, may include: for gap of less than 16us: no-LBT may be used; for gap of above 16us but does not exceed 25us: one-shot LBT may be used; for single switching point, for the gap from DL transmission to UL transmission exceeds 25us: one-shot LBT may be used; for multiple switching points, for the gap from DL transmission to UL transmission exceeds 25us, one-shot LBT may be used.

In an example, a signal that facilitates its detection with low complexity may be useful for UE power saving; Improved coexistence; Spatial reuse at least within the same operator network, Serving cell transmission burst acquisition, etc.

In an example, operation of new radio on unlicensed bands (NR-U) may employ a signal that contains at least SS/PBCH block burst set transmission. In an example, other channels and signals may be transmitted together as part of the signal. The design of this signal may consider there are no gaps within the time span the signal is transmitted at least within a beam. In an example, gaps may be needed for beam switching. In an example, the occupied channel bandwidth may be satisfied.

In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for 5 GHz band. In an example, initial active DL/UL BWP may be approximately 20 MHz for 6 GHz band if similar channelization as 5 GHz band is used for 6 GHz band.

In an example, HARQ A/N for the corresponding data may be transmitted in the same shared COT. In some examples, the HARQ A/N may be transmitted in a separate COT from the one the corresponding data was transmitted.

In an example, when UL HARQ feedback is transmitted on unlicensed band, NR-U may consider mechanisms to support flexible triggering and multiplexing of HARQ feedback for one or more DL HARQ processes.

In an example, the dependencies of HARQ process information to the timing may be removed. In an example, UCI on PUSCH may carry HARQ process ID, NDI, RVID. In an example, Downlink Feedback Information (DFI) may be used for transmission of HARQ feedback for configured grant.

In an example, both CBRA and CFRA may be supported on NR-U SpCell and CFRA may be supported on NR-U SCells. In an example, RAR may be transmitted via SpCell. In an example, a predefined HARQ process ID for RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in unlicensed spectrum may be supported. In an example, an NR cell with DL in unlicensed band and UL in licensed band may be supported. In an example, dual connectivity between licensed band NR (PCell) and NR-U (PSCell) may be supported.

In an example, if absence of Wi-Fi cannot be guaranteed (e.g. by regulation) in a band (e.g., sub-7 GHz) where NR-U is operating, the NR-U operating bandwidth may be an integer multiple of 20 MHz. In an example, at least for band where absence of Wi-Fi cannot be guaranteed (e.g. by regulation), LBT can be performed in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used. In an example, preamble detection may be used.

In an example, with scheduled PUSCH transmissions on an unlicensed carrier, the network first needs to gain access to the channel to transmit PDCCH and then the UE needs to perform LBT again prior to transmitting on the resource. Such procedure tends to increase latency especially when the channel is loaded. In an example, a mechanism of autonomous uplink transmission may be used. In an example, a UE may be pre-allocated a resource for transmission similar to UL SPS and performs LBT prior to using the resource. In an example, autonomous uplink may be based on the Configured Grant functionality (e.g., Type 1 and/or Type 2).

In an example, the HARQ process identity may be transmitted by the UE (e.g., as UCI). This may enable a UE to use the first available transmission opportunity irrespective of the HARQ process. In an example, UCI on PUSCH may be used to carry HARQ process ID, NDI and RVID.

For unlicensed band, UL dynamic grant scheduled transmission may increase the delay and transmission failure possibility due to at least two LBTs of UE and gNB. Pre-configured grant such as configured grant in NR may be used for NR-U, which may decrease the number of LBTs performed and control signaling overhead.

In an example, in a Type 1 configured grant, an uplink grant is provided by RRC, and stored as configured uplink grant. In an example, in Type 2 configured grant, an uplink grant is provided by PDCCH, and stored or cleared as configured uplink grant based on L1 signaling indicating configured grant activation or deactivation.

In an example, there may not be a dependency between HARQ process information to the timing. In an example, UCI on PUSCH may carry HARQ process ID, NDI, RVID, etc. In an example, UE may autonomously select one HARQ process ID which is informed to gNB by UCI.

In an example, a UE may perform non-adaptive retransmission with the configured uplink grant. When dynamic grant for configured grant retransmission is blocked due to LBT, UE may try to transmit in the next available resource with configured grant.

In an example, Downlink Feedback Information (DFI) may be transmitted (e.g., using DCI) may include HARQ feedback for configured grant transmission. The UE may perform transmission/retransmission using configured grant according to DFI including HARQ feedback. In an example, wideband carrier with more than one channels is supported on NR-based unlicensed cell.

In an example, there may be one active BWP in a carrier. In an example, a BWP with multiple channels may be activated. In an example, when absence of Wi-Fi cannot be guaranteed (e.g. by regulation), LBT may be performed in units of 20 MHz. In this case, there may be multiple parallel LBT procedures for this BWP. The actual transmission bandwidth may be subject to subband with LBT success, which may result in dynamic bandwidth transmission within this active wideband BWP.

In an example, multiple active BWPs may be supported. To maximize the BWP utilization efficiency, the BWP bandwidth may be the same as the bandwidth of subband for LBT, e.g., LBT is carried out on each BWP. The network may activate/deactivate the BWPs based on data volume to be transmitted.

In an example, multiple non overlapped BWPs may be activated for a UE within a wide component carrier, which may be similar as carrier aggregation in LTE LAA. To maximize the BWP utilization efficiency, the BWP bandwidth may be the same as the bandwidth of subband for LBT, i.e. LBT is carrier out on each BWP. When more than one subband LBT success, it requires UE to have the capability to support multiple narrow RF or a wide RF which includes these multiple activated BWPs.

In an example, a single wideband BWP may be activated for a UE within a component carrier. The bandwidth of wideband BWP may be in the unit of subband for LBT. For example, if the subband for LBT is 20 MHz in 5 GHz band, the wideband BWP bandwidth may consist of multiple 20 MHz. The actual transmission bandwidth may be subject to subband with LBT success, which may result in dynamic bandwidth transmission within this active wideband BWP.

In an example, active BWP switching may be achieved by use of scheduling DCI. In an example, the network may indicate to the UE a new active BWP to use for an upcoming, and any subsequent, data transmission/reception. In an example, a UE may monitor multiple, configured BWPs to determine which has been acquired for DL transmissions by the gNB. For example, a UE may be configured with monitoring occasion periodicity and offset for each configured BWP. The UE may attempt to determine if a BWP has been acquired by the gNB during those monitoring occasions. In an example, upon successfully determining that the channel is acquired, the UE may continue with that BWP as its active BWP, at least until indicated otherwise or MCOT has been reached. In an example, when a UE has determined that a BWP is active, it may attempt blind detection of PDCCH in configured CORESETs and it might also perform measurements on aperiodic or SPS resources.

In an example, for UL transmissions, a UE may be configured with multiple UL resources, possibly in different BWPs. The UE may have multiple LBT configurations, each tied to a BWP and possibly a beam pair link. The UE may be granted UL resources tied to one or more LBT configurations. Similarly, the UE may be provided with multiple AUL/grant-free resources each requiring the use of different LBT configurations. Providing a UE with multiple AUL resources over multiple BWPs may ensure that if LBT fails using a first LBT configuration for one AUL resource in one BWP a UE can attempt transmission in another AUL resource in another BWP. This may reduce the channel access latency and make better use of the over-all unlicensed carrier.

The carrier aggregation with at least one SCell operating in the unlicensed spectrum may be referred to as Licensed-Assisted Access (LAA). In LAA, the configured set of serving cells for a UE may include at least one SCell operating in the unlicensed spectrum according to a first frame structure (e.g., frame structure Type 3). The SCell may be called LAA SCell.

In an example, if the absence of IEEE802.11n/11ac devices sharing the carrier cannot be guaranteed on a long term basis (e.g., by level of regulation), and for if the maximum number of unlicensed channels that network may simultaneously transmit on is equal to or less than 4, the maximum frequency separation between any two carrier center frequencies on which LAA SCell transmissions are performed may be less than or equal to 62 MHz. In an example, the UE may be required to support frequency separation.

In an example, base station and UE may apply Listen-Before-Talk (LBT) before performing a transmission on LAA SCell. When LBT is applied, the transmitter may listen to/sense the channel to determine whether the channel is free or busy. If the channel is determined to be free/clear, the transmitter may perform the transmission; otherwise, it may not perform the transmission. In an example, if base station uses channel access signals of other technologies for the purpose of channel access, it may continue to meet the LAA maximum energy detection threshold requirement.

In an example, the combined time of transmissions compliant with the channel access procedure by a base station may not exceed 50 ms in any contiguous 1 second period on an LAA SCell.

In an example, which LBT type (e.g., type 1 or type 2 uplink channel access) the UE applies may be signaled via uplink grant for uplink PUSCH transmission on LAA SCells. In an example, for Autonomous Uplink (AUL) transmissions the LBT may not be signaled in the uplink grant.

In an example, for type 1 uplink channel access on AUL, base station may signal the Channel Access Priority Class for a logical channel and UE may select the highest Channel Access Priority Class (e.g., with a lower number in FIG. 16) of the logical channel(s) with MAC SDU multiplexed into the MAC PDU. In an example, the MAC CEs except padding BSR may use the lowest Channel Access Priority Class.

In an example, for type 2 uplink channel access on AUL, the UE may select logical channels corresponding to any Channel Access Priority Class for UL transmission in the subframes signaled by base station in common downlink control signaling.

In an example, for uplink LAA operation, the base station may not schedule the UE more subframes than the minimum necessary to transmit the traffic corresponding to the selected Channel Access Priority Class or lower (e.g., with a lower number in FIG. 16), than the channel Access Priority Class signaled in UL grant based on the latest BSR and received uplink traffic from the UE if type 1 uplink channel access procedure is signaled to the UE; and/or Channel Access Priority Class used by the base station based on the downlink traffic, the latest BSR and received UL traffic from the UE if type 2 uplink channel access procedure is signaled to the UE.

In an example, a first number (e.g., four) Channel Access Priority Classes may be used when performing uplink and downlink transmissions in LAA carriers. In an example in FIG. 16 shows which Channel Access Priority Class may be used by traffic belonging to the different standardized QCIs. A non-standardized QCI (e.g., Operator specific QCI) may use suitable Channel Access Priority Class based on the FIG. 16 for example, e.g., the Channel Access Priority Class used for a non-standardized QCI should be the Channel Access Priority Class of the standardized QCIs which best matches the traffic class of the non-standardized QCI.

In an example, for uplink, the base station may select the Channel Access Priority Class by taking into account the lowest priority QCI in a Logical Channel Group.

In an example, four Channel Access Priority Classes may be used. If a DL transmission burst with PDSCH is transmitted, for which channel access has been obtained using Channel Access Priority Class P (1 . . . 4), the base station may ensure the following where a DL transmission burst refers to the continuous transmission by base station after a successful LBT: the transmission duration of the DL transmission burst may not exceed the minimum duration needed to transmit all available buffered traffic corresponding to Channel Access Priority Class(es)≤P; the transmission duration of the DL transmission burst may not exceed the Maximum Channel Occupancy Time for Channel Access Priority Class P; and additional traffic corresponding to Channel Access Priority Class(s)≥P may be included in the DL transmission burst once no more data corresponding to Channel Access Priority Class≤P is available for transmission. In such cases, base station may maximize occupancy of the remaining transmission resources in the DL transmission burst with this additional traffic.

In an example, when the PDCCH of an LAA SCell is configured, if cross-carrier scheduling applies to uplink transmission, it may be scheduled for downlink transmission via its PDCCH and for uplink transmission via the PDCCH of one other serving cell. In an example, when the PDCCH of an LAA SCell is configured, if self-scheduling applies to both uplink transmission and downlink transmission, it may be scheduled for uplink transmission and downlink transmission via its PDCCH.

In an example, Autonomous uplink may be supported on the SCells. In an example, one or more autonomous uplink configuration may be supported per SCell. In an example, multiple autonomous uplink configurations may be active simultaneously when there is more than one SCell.

In an example, when autonomous uplink is configured by RRC, the following information may be provided in an AUL configuration information element (e.g., AUL-Config): AUL C-RNTI; HARQ process IDs aul-harq-processes that may be configured for autonomous UL HARQ operation, the time period aul-retransmissionTimer before triggering a new transmission or a retransmission of the same HARQ process using autonomous uplink; the bitmap aul-subframes that indicates the subframes that are configured for autonomous UL HARQ operation.

In an example, when the autonomous uplink configuration is released by RRC, the corresponding configured grant may be cleared.

In an example, if AUL-Config is configured, the MAC entity may consider that a configured uplink grant occurs in those subframes for which aul-subframes is set to 1.

In an example, if AUL confirmation has been triggered and not cancelled, if the MAC entity has UL resources allocated for new transmission for this TTI, the MAC entity may instruct a Multiplexing and Assembly procedure to generate an AUL confirmation MAC Control Element; the MAC entity may cancel the triggered AUL confirmation.

In an example, the MAC entity may clear the configured uplink grant for the SCell in response first transmission of AUL confirmation MAC Control Element triggered by the AUL release for this SCell. In an example, retransmissions for uplink transmissions using autonomous uplink may continue after clearing the corresponding configured uplink grant.

In an example, a MAC entity may be configured with AUL-RNTI for AUL operation. In an example, an uplink grant may be received for a transmission time interval for a Serving Cell on the PDCCH for the MAC entity's AUL C-RNTI. In an example, if the NDI in the received HARQ information is 1, the MAC entity may consider the NDI for the corresponding HARQ process not to have been toggled. The MAC entity may deliver the uplink grant and the associated HARQ information to the HARQ entity for this transmission time interval. In an example, if the NDI in the received HARQ information is 0 and if PDCCH contents indicate AUL release, the MAC entity may trigger an AUL confirmation. If an uplink grant for this TTI has been configured, the MAC entity may consider the NDI bit for the corresponding HARQ process to have been toggled. The MAC entity may deliver the configured uplink grant and the associated HARQ information to the HARQ entity for this TTI. In an example, if the NDI in the received HARQ information is 0 and if PDCCH contents indicate AUL activation, the MAC entity may trigger an AUL confirmation.

In an example, if the aul-retransmissionTimer is not running and if there is no uplink grant previously delivered to the HARQ entity for the same HARQ process; or if the previous uplink grant delivered to the HARQ entity for the same HARQ process was not an uplink grant received for the MAC entity's C-RNTI; or if the HARQ_FEEDBACK is set to ACK for the corresponding HARQ process, the MAC entity may deliver the configured uplink grant, and the associated HARQ information to the HARQ entity for this TTI.

In an example, the NDI transmitted in the PDCCH for the MAC entity's AUL C-RNTI may be set to 0.

In an example, for configured uplink grants, if UL HARQ operation is autonomous, the HARQ Process ID associated with a TTI for transmission on a Serving Cell may be selected by the UE implementation from the HARQ process IDs that are configured for autonomous UL HARQ operation by upper layers for example, in aul-harq-processes.

In an example, for autonomous HARQ, a HARQ process may maintain a state variable e.g., HARQ_FEEDBACK, which may indicate the HARQ feedback for the MAC PDU currently in the buffer, and/or a timer aul-retransmission-Timer which may prohibit new transmission or retransmission for the same HARQ process when the timer is running.

In an example, when the HARQ feedback is received for a TB, the HARQ process may set HARQ_FEEDBACK to the received value; and may stop the aul-retransmission-Timer if running.

In an example, when PUSCH transmission is performed for a TB and if the uplink grant is a configured grant for the MAC entity's AUL C-RNTI, the HARQ process start the aul-retransmissionTimer.

In an example, if the HARQ entity requests a new transmission, the HARQ process may set HARQ_FEEDBACK to NACK if UL HARQ operation is autonomous asynchronous. if the uplink grant was addressed to the AUL C-RNTI, set CURRENT_IRV to 0.

In an example, if aperiodic CSI requested for a TTI, the MAC entity may not generate a MAC PDU for the HARQ entity in case the grant indicated to the HARQ entity is a configured uplink grant activated by the MAC entity's AUL C-RNTI.

In an example, if the UE detects on the scheduling cell for UL transmissions on an LAA SCell a transmission of DCI (e.g., Format 0A/4A) with the CRC scrambled by AUL C-RNTI carrying AUL-DFI, the UE may use the autonomous uplink feedback information according to the following procedures: for a HARQ process configured for autonomous uplink transmission, the corresponding HARQ-ACK feedback may be delivered to higher layers. For the HARQ processes not configured for autonomous uplink transmission, the corresponding HARQ-ACK feedback may not delivered to higher layers; for an uplink transmission in subframe/slot/TTI n, the UE may expect HARQ-ACK feedback in the AUL-DFI at earliest in subframe n+4; If the UE receives AUL-DFI in a subframe indicating ACK for a HARQ process, the UE may not be expected to receive AUL-DFI indicating ACK for the same HARQ process prior to 4 ms after the UE transmits another uplink transmission associated with that HARQ process;

In an example, a UE may validate an autonomous uplink assignment PDCCH/EPDCCH if all the following conditions are met: the CRC parity bits obtained for the PDCCH/EPDCCH payload are scrambled with the AUL C-RNTI; and the 'Flag for AUL differentiation' indicates activating/releasing AUL transmission. In an example, one or more fields in an activation DCI may be pre-configured values for validation.

In an example, a BWP IE may be used to configure a bandwidth part. For a serving cell the network may configure at least an initial bandwidth part comprising of at least a downlink bandwidth part and one (if the serving cell is configured with an uplink) or two (if using supplementary uplink (SUL)) uplink bandwidth parts. In an example, the network may configure additional uplink and downlink bandwidth parts for a serving cell.

In an example, the bandwidth part configuration may be split into uplink and downlink parameters and into common and dedicated parameters. Common parameters (e.g., in BWP-UplinkCommon and BWP-DownlinkCommon) may be cell specific and the network may ensure the necessary alignment with corresponding parameters of other UEs. In an example, the common parameters of the initial bandwidth part of the PCell may be provided via system information. In an example, for other serving cells, the network may provide the common parameters via dedicated signaling. An example BWP information element is shown below:

```
BWP::=SEQUENCE {
    locationAndBandwidth INTEGER (0 . . . 37949),
    subcarrierSpacing SubcarrierSpacing,
    cyclicPrefix          ENUMERATED          {extended}
        OPTIONAL --Need R
}
BWP-Uplink::=SEQUENCE {
    bwp-Id BWP-Id,
    bwp-Common                         BWP-UplinkCommon
        OPTIONAL, --Need M
    bwp-Dedicated                      BWP-UplinkDedicated
        OPTIONAL, --Need M
}
BWP-UplinkCommon::=SEQUENCE {
    genericParameters BWP,
    rach-ConfigCommon SetupRelease {RACH-ConfigCommon} OPTIONAL, --Need M
    pusch-ConfigCommon SetupRelease {PUSCH-ConfigCommon} OPTIONAL, --Need M
    pucch-ConfigCommon SetupRelease {PUCCH-ConfigCommon} OPTIONAL, --Need M
}
BWP-UplinkDedicated::=SEQUENCE {
    pucch-Config       SetupRelease      {PUCCH-Config}
        OPTIONAL, --Need M
    pusch-Config       SetupRelease      {PUSCH-Config}
        OPTIONAL, --Cond SetupOnly
    configuredGrantConfig SetupRelease {ConfiguredGrantConfig} OPTIONAL, --Need M
    srs-Config         SetupRelease       {SRS-Config}
        OPTIONAL, --Need M
    beamFailureRecoveryConfig SetupRelease {BeamFailureRecoveryConfig} OPTIONAL, --Cond SpCellOnly
}
BWP-Downlink::=SEQUENCE {
    bwp-Id BWP-Id,
    bwp-Common                       BWP-DownlinkCommon
        OPTIONAL, --Need M
    bwp-Dedicated                    WP-DownlinkDedicated
        OPTIONAL, --Need M
}
BWP-DownlinkCommon::=SEQUENCE {
    genericParameters BWP,
    pdcch-ConfigCommon SetupRelease {PDCCH-ConfigCommon} OPTIONAL, --Need M
    pdsch-ConfigCommon SetupRelease {PDSCH-ConfigCommon} OPTIONAL, --Need M
}
BWP-DownlinkDedicated::=SEQUENCE {
    pdcch-Config       SetupRelease      {PDCCH-Config}
        OPTIONAL, --Need M
    pdsch-Config       SetupRelease      {PDSCH-Config}
        OPTIONAL, --Need M
``` sps-Config SetupRelease {SPS-Config} OPTIONAL, --Need M
radioLinkMonitoringConfig SetupRelease {RadioLinkMonitoringConfig} OPTIONAL, --Need M
}

In an example, cyclicPrefix may indicate whether to use the extended cyclic prefix for this bandwidth part. If not set, the UE may use the normal cyclic prefix. In an example, normal CP may be supported for all numerologies and slot formats. Extended CP may be supported only for 60 kHz subcarrier spacing. In an example, locationAndBandwidth may indicate frequency domain location and bandwidth of a bandwidth part. The value of the field may be interpreted as resource indicator value (RIV). In an example, the first PRB may be a PRB determined by subcarrierSpacing of this BWP and offsetToCarrier (for example, configured in SCS-SpecificCarrier contained within FrequencyInfoDL) corresponding to this subcarrier spacing. In case of TDD, a BWP-pair (UL BWP and DL BWP with the same bwp-Id) may have the same center frequency.

In an example, subcarrierSpacing may indicate subcarrier spacing to be used in this BWP for all channels and reference signals unless explicitly configured elsewhere. The value kHz 15 may correspond to µ=0, kHz 30 to µ=1, and so on. In an example, bwp-Id may indicate an identifier for a bandwidth part. In an example, the BWP ID=0 be associated with the initial BWP. In an example, the NW may trigger the UE to switch UL or DL BWP using a DCI field. The four code points in that DCI field map to the RRC-configured BWP-ID may be for up to 3 configured BWPs (in addition to the initial BWP) the DCI code point may be equivalent to the BWP ID (initial=0, first dedicated=1, . . . ). In an example, if the NW configures 4 dedicated bandwidth parts, they are identified by DCI code points 0 to 3. In an example, radioLinkMonitoringConfig may indicate UE specific configuration of radio link monitoring for detecting cell- and beam radio link failure occasions. In an example, bwp-Id may indicate an identifier for a bandwidth part. In an example, the BWP ID=0 may be associated with the initial BWP. In an example, the NW may trigger the UE to switch UL or DL BWP using a DCI field. The four code points in that DCI field map to the RRC-configured BWP-ID may be: For up to 3 configured BWPs (in addition to the initial BWP) the DCI code point is equivalent to the BWP ID (initial=0, first dedicated=1, . . . ). If the NW configures 4 dedicated bandwidth parts, they are identified by DCI code points 0 to 3.

In an example, rach-ConfigCommon may indicate configuration of cell specific random access parameters which the UE uses for contention based and contention free random access as well as for contention based beam failure recovery. Ina n example, the NW may configure SSB-based RA (and hence RACH-ConfigCommon) for UL BWPs if the linked DL BWPs allows the UE to acquire the SSB associated to the serving cell. In an example, beamFailureRecoveryConfig may determine how the UE performs Beam Failure Recovery upon detection of a Beam Failure.

In an example, a BeamFailureRecoveryConfig IE may be used to configure the UE with RACH resources and candidate beams for beam failure recovery in case of beam failure detection. An example BeamFailureRecoveryConfig information element is shown below:

BeamFailureRecoveryConfig::=SEQUENCE {
    rootSequenceIndex-BFR INTEGER (0 . . . 137) OPTIONAL, --Need M
    rach-ConfigBFR RACH-ConfigGeneric OPTIONAL, --Need M
    rsrp-ThresholdSSB RSRP-Range OPTIONAL, --Need M
    candidateBeamRSList SEQUENCE (SIZE(1 . . . maxNrofCandidateBeams)) OF PRACH-ResourceDedicatedBFR OPTIONAL, --Need M
    ssb-perRACH-Occasion ENUMERATED {oneEighth, oneFourth, oneHalf, one, two, four, eight, sixteen} OPTIONAL, --Need M
    ra-ssb-OccasionMaskIndex INTEGER (0 . . . 15) OPTIONAL, --Need M
    recoverySearchSpaceId SearchSpaceId OPTIONAL, --Cond CF-BFR
    ra-Prioritization RA-Prioritization OPTIONAL, --Need R
    beamFailureRecoveryTimer ENUMERATED {ms10, ms20, ms40, ms60, ms80, ms100, ms150, ms200} OPTIONAL, --Need M
}
PRACH-ResourceDedicatedBFR::=CHOICE {
    ssb BFR-SSB-Resource,
    csi-RS BFR-CSIRS-Resource
}
BFR-SSB-Resource::=SEQUENCE{
    ssb SSB-Index,
    ra-PreambleIndex INTEGER (0 . . . 63),
}
BFR-CSIRS-Resource::=SEQUENCE {
    csi-RS NZP-CSI-RS-ResourceId,
    ra-OccasionList SEQUENCE (SIZE(1 . . . maxRA-OccasionsPerCSIRS)) OF INTEGER (0 . . . maxRA-Occasions−1) OPTIONAL, --Need R
    ra-PreambleIndex INTEGER (0 . . . 63) OPTIONAL, --Need R
}

In an example, beamFailureRecoveryTimer may indicate a timer for beam failure recovery timer. Upon expiration of the timer the UE may not use CFRA for BFR. beamFailureRecoveryTimer may have value in ms. ms 10 may correspond to 10 ms, ms 20 to 20 ms, and so on. In an example, candidateBeamRSList may indicate a list of reference signals (CSI-RS and/or SSB) identifying the candidate beams for recovery and the associated RA parameters. In an example, rsrp-ThresholdSSB may indicate L1-RSRP threshold used for determining whether a candidate beam may be used by the UE to attempt contention free Random Access to recover from beam failure. The signaled threshold may be applied directly for SSB. A threshold for CSI-RS may be determined by linearly scaling signaled value based on Pc_ss corresponding to the CSI-RS resource. Ina n example, ra-prioritization may indicate parameters which apply for prioritized random access procedure for BFR (beam failure recovery). In an example, ra-ssb-OccasionMaskIndex may be explicitly signaled PRACH Mask Index for RA Resource selection. In an example, the mask may be valid for all SSB resources.

In an example, rach-ConfigBFR may indicate configuration free random access occasions for BFR. In an example, recoverySearchSpaceId may indicate search space for BFR RAR. In an example, ssb-perRACH-Occasion may indicate a number of SSBs per RACH occasion. In an example, csi-RS may indicate the ID of a NZP-CSI-RS-Resource configured in the CSI-MeasConfig of this serving cell. This reference signal may determine a candidate beam for beam failure recovery (BFR). In an example, ra-PreambleIndex may indicate the RA preamble index to use in the RA occasions associated with this CSI-RS. If this field is absent, the UE may use the preamble index associated with the SSB that is QCLed with this CSI-RS.

In an example, a RACH-ConfigGeneric IE may be used to specify the cell specific random-access parameters both for regular random access as well as for beam failure recovery. An example RACH-ConfigGeneric IE is shown below:
RACH-ConfigGeneric::=SEQUENCE {
prach-ConfigurationIndex INTEGER (0 . . . 255),
   msg1-FDM ENUMERATED {one, two, four, eight},
   msg1-FrequencyStart INTEGER (0 . . . maxNrofPhysicalResourceBlocks−1),
   zeroCorrelationZoneConfig INTEGER(0 . . . 15),
   preambleReceivedTargetPower INTEGER (−202 . . . −60),
   preambleTransMax ENUMERATED {n3, n4, n5, n6, n7, n8, n10, n20, n50, n100, n200},
   powerRampingStep ENUMERATED {dB0, dB2, dB4, dB6},
   ra-ResponseWindow ENUMERATED {sl1, sl2, sl4, sl8, sl10, sl20, sl40, sl80},
}

In an example, msg1-FDM may indicate a number of PRACH occasions FDMed in one time instance. In an example, msg1-FrequencyStart may indicate an offset of lowest PRACH transmission occasion in frequency domain with respective to PRB 0. The value may be configured so that the corresponding RACH resource is entirely within the bandwidth of the UL BWP. In an example, powerRampingStep may indicate power ramping step for PRACH. In an example, prach-ConfigurationIndex may indicate a PRACH configuration index. In an example, preambleREceivedTargetPower may indicate the target power level at the network receiver side. In an example, preambleTransMax may indicate maximum number of RA preamble transmission performed before declaring a failure. In an example, ra-ResponseWindow may indicate Msg2 (RAR) window length in number of slots.

In an example, RadioLinkMonitoringConfig IE may be used to configure radio link monitoring for detection of beam- and/or cell radio link failure. An example, RadioLinkMonitoringConfig IE is show below:
RadioLinkMonitoringConfig::=SEQUENCE {
   failureDetectionResourcesToAddModList SEQUENCE (SIZE(1 . . . maxNrofFailureDetectionResources)) OF RadioLinkMonitoringRS OPTIONAL, --Need N
   failureDetectionResourcesToReleaseList SEQUENCE (SIZE(1 . . . maxNrofFailureDetectionResources)) OF RadioLinkMonitoringRS-Id OPTIONAL,--Need N
   beamFailureInstanceMaxCount ENUMERATED {n1, n2, n3, n4, n5, n6, n8, n10} OPTIONAL, --Need S
   beamFailureDetectionTimer ENUMERATED {pbfd1, pbfd2, pbfd3, pbfd4, pbfd5, pbfd6, pbfd8, pbfd10} OPTIONAL, --Need R
}
RadioLinkMonitoringRS::=SEQUENCE {
   radioLinkMonitoringRS-Id RadioLinkMonitoringRS-Id,
   purpose ENUMERATED {beamFailure, rlf, both},
   detectionResource CHOICE {
     ssb-Index SSB-Index,
     csi-RS-Index NZP-CSI-RS-ResourceId
   },
}

In an example, beamFailureDetectionTimer may indicate a timer for beam failure detection In an example, the value may be in number of "periods of Beam Failure Detection" Reference Signal. Value pbfd1 may correspond to 1 period of Beam Failure Detection Reference Signal, value pbfd2 may correspond to 2 periods of Beam Failure Detection Reference Signal and so on. When the network reconfigures this field, the UE may reset on-going beamFailureDetectionTimer and the counter related to beamFailureInstanceMaxCount. In an example, beamFailureInstanceMaxCount may determine after how many beam failure events the UE triggers beam failure recovery. In an example, value n1 may correspond to 1 beam failure instance, n2 may correspond to 2 beam failure instances and so on. When the network reconfigures this field, the UE may reset on-going-beamFailureDetectionTimer and the counter related to beamFailureInstanceMaxCount. If the field is absent, the UE may not trigger beam failure recovery. In an example, failureDetectionResourcesToAddModList may indicate a list of reference signals for detecting beam failure and/or cell level radio link failure (RLF). The network may configure at most two detectionResources per BWP for the purpose beamFailure or both. If no RSs are provided for the purpose of beam failure detection, the UE may perform beam monitoring based on the activated TCI-State for PDCCH. In an example, if the activated TCI state refers to an aperiodic or semi-persistent CSI-RS, the gNB may configure the failure detection resources explicitly. If no RSs are provided in this list at all (neither for Cell- nor for Beam-RLM), the UE may perform also Cell-RLM based on the activated TCI-State of PDCCH. When the RS(s) for RLF is reconfigured by the network, the UE may reset T310 and the counters related to N310 and N311. When the RS(s) for beam failure detection (BFD) may be reconfigured by the network, the UE may reset the on-going beamFailureDetectionTimer and the counter related to beamFailureInstanceMaxCount.

In an example, the MAC entity may be configured by RRC with a beam failure recovery procedure which may be used for indicating to the serving gNB of a new SSB or CSI-RS when beam failure is detected on the serving SSB(s)/CSI-RS(s). Beam failure may be detected by counting beam failure instance indication from the lower layers to the MAC entity.

In an example, RRC may configure the following parameters in the BeamFailureRecoveryConfig for the Beam Failure Detection and Recovery procedure: beamFailureInstanceMaxCount for the beam failure detection; beamFailureDetectionTimer for the beam failure detection; beamFailureRecoveryTimer for the beam failure recovery procedure; rsrp-ThresholdSSB: an RSRP threshold for the beam failure recovery; powerRampingStep: powerRampingStep for the beam failure recovery; preambleReceivedTargetPower: preambleReceivedTargetPower for the beam failure recovery; preambleTransMax: preambleTransMax for the beam failure recovery; ra-ResponseWindow: the time window to monitor response(s) for the beam failure recovery using contention-free Random Access Preamble; prach-ConfigIndex: prach-ConfigIndex for the beam failure recovery; ra-ssb-OccasionMaskIndex: ra-ssb-OccasionMaskIndex for the beam failure recovery; ra-OccasionList: ra-OccasionList for the beam failure recovery. In an example the UE variable BFI_COUNTER may indicate a counter for beam failure instance indication which may be initially set to 0.

In an example, if beam failure instance indication has been received from lower layers, the MAC entity may start or restart the beamFailureDetectionTimer; the MAC entity may increment BFI_COUNTER by 1. In an example, if BFI_COUNTER>=beamFailureInstanceMaxCount and if beamFailureRecoveryConfig is configured, the MAC entity may start the beamFailureRecoveryTimer, if configured. The MAC entity may initiate a Random Access procedure on the SpCell by applying the parameters powerRampingStep, preambleReceivedTargetPower, and preambleTransMax configured in beamFailureRecoveryConfig. In an example, if BFI_COUNTER>=beamFailureInstanceMaxCount and if beamFailureRecoveryConfig is not configured, the MAC entity may initiate a Random Access procedure (see subclause 5.1) on the SpCell.

In an example, if the beamFailureDetectionTimer expires, the MAC entity may set BFI_COUNTER to 0. In an example, if the Random Access procedure is successfully completed: the MAC entity may stop the beamFailureRecoveryTimer, if configured. The MAC entity may consider the Beam Failure Recovery procedure successfully completed.

In an example, a Random Access procedure may be initiated by a PDCCH order, by the MAC entity itself, or by RRC. In an example, there may be one Random Access procedure ongoing at any point in time in a MAC entity. The Random Access procedure on an SCell may be initiated by a PDCCH order with ra-PreambleIndex different from 0b000000.

In an example, if the MAC entity receives a request for a new Random Access procedure while another is already ongoing in the MAC entity, it may be up to UE implementation whether to continue with the ongoing procedure or start with the new procedure (e.g. for SI request).

In an example, RRC may configure the following parameters for the Random Access procedure: prach-ConfigIndex: the available set of PRACH occasions for the transmission of the Random Access Preamble; preambleReceivedTargetPower: initial Random Access Preamble power; rsrp-ThresholdSSB: an RSRP threshold for the selection of the SSB and corresponding Random Access Preamble and/or PRACH occasion. If the Random Access procedure is initiated for beam failure recovery, rsrp-ThresholdSSB may refer to rsrp-ThresholdSSB in BeamFailureRecoveryConfig IE; rsrp-ThresholdCSI-RS: an RSRP threshold for the selection of CSI-RS and corresponding Random Access Preamble and/or PRACH occasion. If the Random Access procedure is initiated for beam failure recovery, rsrp-ThresholdCSI-RS may be set to a value calculated by multiplying rsrp-ThresholdSSB in BeamFailureRecoveryConfig IE by powerControlOffset; rsrp-ThresholdSSB-SUL: an RSRP threshold for the selection between the NUL carrier and the SUL carrier; powerControlOffset: a power offset between rsrp-ThresholdSSB and rsrp-ThresholdCSI-RS to be used when the Random Access procedure is initiated for beam failure recovery; powerRampingStep: the power-ramping factor; powerRampingStepHighPriority: the power-ramping factor in case of differentiated Random Access procedure; scalingFactorBL: a scaling factor for differentiated Random Access procedure; ra-PreambleIndex: Random Access Preamble; ra-ssb-OccasionMaskIndex: defines PRACH occasion(s) associated with an SSB in which the MAC entity may transmit a Random Access Preamble; ra-OccasionList: defines PRACH occasion(s) associated with a CSI-RS in which the MAC entity may transmit a Random Access Preamble; preambleTransMax: the maximum number of Random Access Preamble transmission; ssb-perRACH-OccasionAndCB-PreamblesPerSSB (SpCell only): defines the number of SSBs mapped to each PRACH occasion and the number of Random Access Preambles mapped to each SSB;

In an example, if groupBconfigured is configured, then Random Access Preambles group B is configured. The Random Access Preambles in Random Access Preamble group A may be the Random Access Preambles 0 to numberOfRA-PreamblesGroupA−1, if Random Access Preambles group B is configured; Otherwise, the Random Access Preambles in Random Access Preamble group A are the Random Access Preambles 0 to the number of Random Access Preambles per SSB configured by ssb-perRACH-OccasionAndCB-PreamblesPerSSB. In an example, the Random Access Preambles in Random Access Preamble group B, if configured, are the Random Access Preambles numberOfRA-PreamblesGroupA to the number of Random Access Preambles per SSB configured by ssb-perRACH-OccasionAndCB-PreamblesPerSSB.

In an example, if Random Access Preambles group B is supported by the cell and SSBs are mapped to Random Access Preambles, Random Access Preambles group B may be included in each SSB.

In an example, if Random Access Preambles group B is configured, following parameters may be configured: ra-Msg3SizeGroupA (per cell) may indicate the threshold to determine the groups of Random Access Preambles; msg3-DeltaPreamble may indicate ΔPREAMBLE; messagePowerOffsetGroupB: the power offset for preamble selection; numberOfRA-PreamblesGroupA (SpCell only): defines the number of Random Access Preambles in Random Access Preamble group A for each SSB; the set of Random Access Preambles and/or PRACH occasions for SI request, if any; the set of Random Access Preambles and/or PRACH occasions for beam failure recovery request, if any; ra-ResponseWindow: the time window to monitor RA response(s) (SpCell only); ra-ContentionResolutionTimer: the Contention Resolution Timer (SpCell only).

In an example, the following information for related Serving Cell is assumed to be available for UEs: if Random Access Preambles group B is configured: if the Serving Cell for the Random Access procedure is configured with supplementaryUplink, and SUL carrier is selected for performing Random Access Procedure: PCMAX,f,c of the SUL carrier; otherwise PCMAX,f,c of the NUL carrier.

In an example, the following UE variables may be used for the Random Access procedure: PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and TEMPORARY_C-RNTI.

In an example, when the Random Access procedure is initiated on a Serving Cell, the MAC entity may: flush the Msg3 buffer; set the PREAMBLE_TRANSMISSION_COUNTER to 1; set the PREAMBLE_POWER_RAMPING_COUNTER to 1; and set the PREAMBLE_BACKOFF to 0 ms. In an example, if the carrier to use for the Random Access procedure is explicitly signaled, the MAC entity select the signaled carrier for performing Random Access procedure; and set the PCMAX to PCMAX,f,c of the signaled carrier. In an example, if the carrier to use for the Random Access procedure is not explicitly signaled; and if the Serving Cell for the Random Access procedure is configured with supplementaryUplink; and if the RSRP of the downlink pathloss reference is less than rsrp-ThresholdSSB-SUL: the MAC entity may select the SUL carrier for performing Random Access procedure and set the PCMAX to PCMAX,f,c of the SUL carrier. Otherwise, the MAC entity may select the NUL carrier for performing Random Access procedure; and set the PCMAX to PCMAX,f,c of the NUL carrier. In an example, the MAC entity may set PREAMBLE_POWER_RAMPING_STEP to preamblePowerRampingStep; In an example, if powerRampingStepHighPriority is configured: if the Random Access procedure was initiated for beam failure recovery; or if the Random Access procedure was initiated for handover: the MAC entity may set the PREAMBLE_POWER_RAMPING_STEP to powerRampingStepHighPriority; set SCALING_FACTOR_BI to 1. In an example, if scalingFactorBI is configured: if the Random Access procedure was initiated for beam failure recovery; or if the Random Access procedure was initiated for handover: the MAC entity may set the SCALING_FACTOR_BI to scalingFactorBI.

In an example, if the Random Access procedure was initiated for beam failure recovery; and if the beamFailureRecovery Timer is either running or not configured; and if the contention-free Random Access Resources for beam failure recovery request associated with any of the SSBs and/or CSI-RSs have been explicitly provided by RRC; and if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available: the MAC entity may select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList; In an example, if CSI-RS is selected, and there is no ra-PreambleIndex associated with the selected CSI-RS: the MAC entity may set the PREAMBLE_INDEX to a ra-PreambleIndex corresponding to the SSB in candidateBeamRSList which is quasi-collocated with the selected CSI-RS. Otherwise, the MAC entity may set the PREAMBLE_INDEX to a ra-PreambleIndex corresponding to the selected SSB or CSI-RS from the set of Random Access Preambles for beam failure recovery request. In an example, if the ra-PreambleIndex has been explicitly provided by either PDCCH or RRC; and if the ra-PreambleIndex is not 0b000000; and if contention-free Random Access Resource associated with SSBs or CSI-RSs have not been explicitly provided by RRC: the MAC entity may set the PREAMBLE_INDEX to the signaled ra-PreambleIndex. In an example, if the contention-free Random Access Resources associated with SSBs have been explicitly provided by RRC and at least one SSB with SS-RSRP above rsrp-ThresholdSSB amongst the associated SSBs is available: the MAC entity may select an SSB with SS-RSRP above rsrp-ThresholdSSB amongst the associated SSBs; and set the PREAMBLE_INDEX to a ra-PreambleIndex corresponding to the selected SSB. In an example, if the contention-free Random Access Resources associated with CSI-RSs have been explicitly provided by RRC and at least one CSI-RS with CSI-RSRP above rsrp-ThresholdCSI-RS amongst the associated CSI-RSs is available: the MAC entity may select a CSI-RS with CSI-RSRP above rsrp-ThresholdCSI-RS amongst the associated CSI-RSs; and set the PREAMBLE_INDEX to a ra-PreambleIndex corresponding to the selected CSI-RS. Otherwise, if at least one of the SSBs with SS-RSRP above rsrp-ThresholdSSB is available: the MAC entity may select an SSB with SS-RSRP above rsrp-ThresholdSSB. Otherwise may select any SSB. In an example, if Msg3 has not yet been transmitted: if Random Access Preambles group B is configured: if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)-preambleReceivedTargetPower-msg3-DeltaPreamble-messagePowerOffsetGroupB; or if the Random Access procedure was initiated for the CCCH logical channel and the CCCH SDU size plus MAC subheader is greater than ra-Msg3SizeGroupA: the MAC entity may select the Random Access Preambles group B. Otherwise, the MAC entity may select the Random Access Preambles group A. Otherwise the MAC entity may select the Random Access Preambles group A. Otherwise, if Msg3 is being retransmitted): the MAC entity may select the same group of Random Access Preambles as was used for the Random Access Preamble transmission attempt corresponding to the first transmission of Msg3. In an example, if the association between Random Access Preambles and SSBs is configured: the MAC entity may select a ra-PreambleIndex randomly with equal probability from the Random Access Preambles associated with the selected SSB and the selected Random Access Preambles group. Otherwise the MAC entity may select a ra-PreambleIndex randomly with equal probability from the Random Access Preambles within the selected Random Access Preambles group. The MAC entity may set the PREAMBLE_INDEX to the selected ra-PreambleIndex.

In an example, if an SSB is selected above and an association between PRACH occasions and SSBs is configured: the MAC entity may determine the next available PRACH occasion from the PRACH occasions corresponding to the selected SSB permitted by the restrictions given by the ra-ssb-OccasionMaskIndex if configured (the MAC entity shall select a PRACH occasion randomly with equal probability amongst the PRACH occasions occurring simultaneously but on different subcarriers, corresponding to the selected SSB; the MAC entity may take into account the possible occurrence of measurement gaps when determining the next available PRACH occasion corresponding to the selected SSB).

In an example, if a CSI-RS is selected above and an association between PRACH occasions and CSI-RSs is configured: the MAC entity may determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

In an example, if Random Access procedure was initiated for beam failure recovery; and if a CSI-RS is selected above and there is no contention-free Random Access Resource associated with the selected CSI-RS: the MAC entity may determine the next available PRACH occasion from the PRACH occasions, permitted by the restrictions given by the ra-ssb-OccasionMaskIndex if configured, corresponding to the SSB in candidateBeamRSList which is quasi-collocated with the selected CSI-RS (the MAC entity may take into account the possible occurrence of measurement gaps when determining the next available PRACH occasion corresponding to the SSB which is quasi-collated with the selected CSI-RS).

In an example, the MAC entity may determine the next available PRACH occasion (the MAC entity may select a PRACH occasion randomly with equal probability amongst the PRACH occasions occurring simultaneously but on different subcarriers; the MAC entity may take into account the possible occurrence of measurement gaps when determining the next available PRACH occasion).

In an example, for a Random Access Preamble: if PREAMBLE_TRANSMISSION_COUNTER is greater than one; and if the notification of suspending power ramping counter has not been received from lower layers; and if SSB selected is not changed (i.e. same as the previous Random Access Preamble transmission): the MAC entity may increment PREAMBLE_POWER_RAMPING_COUNTER by 1. The MAC entity may select the value of DELTA_PREAMBLE. The MAC entity may set PREAMBLE_RECEIVED_TARGET_POWER to preambleReceivedTarget-Power+DELTA_PREAMBLE+(PREAMBLE_POWER_RAMPING_COUNTER−1)× PREAMBLE_POWER_RAMPING_STEP. In an example, except for contention-free Random Access Preamble for beam failure recovery request, compute the RA-RNTI associated with the PRACH occasion in which the Random Access Preamble is transmitted; the MAC entity may instruct the physical layer to transmit the Random Access Preamble using the selected PRACH, corresponding RA-RNTI (if available), PREAMBLE_INDEX and PREAMBLE_RECEIVED_TARGET_POWER.

In an example, the RA-RNTI associated with the PRACH in which the Random Access Preamble is transmitted, is computed as RA-RNTI=1+s_id+14×t_id+14×80×f_id+14×80×8×ul_carrier_id, where s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the UL carrier used for Msg1 transmission (0 for NUL carrier, and 1 for SUL carrier).

In an example, once the Random Access Preamble is transmitted and regardless of the possible occurrence of a measurement gap, if the contention-free Random Access Preamble for beam failure recovery request was transmitted by the MAC entity, the MAC entity may start the ra-ResponseWindow configured in BeamFailureRecoveryConfig at the first PDCCH occasion from the end of the Random Access Preamble transmission; and the MAC entity may monitor the PDCCH of the SpCell for response to beam failure recovery request identified by the C-RNTI while ra-ResponseWindow is running. Otherwise, the MAC entity may start the ra-ResponseWindow configured in RACH-ConfigCommon at the first PDCCH occasion from the end of the Random Access Preamble transmission; and the MAC entity may monitor the PDCCH of the SpCell for Random Access Response(s) identified by the RA-RNTI while the ra-ResponseWindow is running.

In an example, if notification of a reception of a PDCCH transmission is received from lower layers; and if PDCCH transmission is addressed to the C-RNTI; and if the contention-free Random Access Preamble for beam failure recovery request was transmitted by the MAC entity: the MAC entity may consider the Random Access procedure successfully completed.

In an example, if a downlink assignment has been received on the PDCCH for the RA-RNTI and the received TB is successfully decoded: if the Random Access Response contains a MAC subPDU with Backoff Indicator: the MAC entity may set the PREAMBLE_BACKOFF to value of the BI field of the MAC subPDU, multiplied with SCALING_FACTOR_BI. Otherwise the MAC entity may set the PREAMBLE_BACKOFF to 0 ms. In an example, if the Random Access Response contains a MAC subPDU with Random Access Preamble identifier corresponding to the transmitted PREAMBLE_INDEX: the MAC entity may consider this Random Access Response reception successful. In an example, if the Random Access Response reception is considered successful: if the Random Access Response includes a MAC subPDU with RAPID: the MAC entity may consider this Random Access procedure successfully completed; and the MAC entity may indicate the reception of an acknowledgement for SI request to upper layers. Otherwise, the MAC entity may apply the following actions for the Serving Cell where the Random Access Preamble was transmitted: process the received Timing Advance Command; indicate the preambleReceivedTargetPower and the amount of power ramping applied to the latest Random Access Preamble transmission to lower layers (i.e. (PREAMBLE_POWER_RAMPING_COUNTER−1)× PREAMBLE_POWER_RAMPING_STEP); if the Serving Cell for the Random Access procedure is SRS-only SCell: the MAC entity may ignore the received UL grant. Otherwise the MAC entity may process the received UL grant value and indicate it to the lower layers. In an example, if the Random Access Preamble was not selected by the MAC entity among the contention-based Random Access Preamble(s): the MAC entity may consider the Random Access procedure successfully completed. Otherwise, the MAC entity may set the TEMPORARY_C-RNTI to the value received in the Random Access Response; if this is the first successfully received Random Access Response within this Random Access procedure: if the transmission is not being made for the CCCH logical channel: the MAC entity may indicate to the Multiplexing and assembly entity to include a C-RNTI MAC CE in the subsequent uplink transmission. The MAC entity may obtain the MAC PDU to transmit from the Multiplexing and assembly entity and store it in the Msg3 buffer.

In an example, if ra-ResponseWindow configured in RACH-ConfigCommon expires, and if the Random Access Response containing Random Access Preamble identifiers that matches the transmitted PREAMBLE_INDEX has not been received; or if ra-ResponseWindow configured in BeamFailureRecoveryConfig expires and if the PDCCH addressed to the C-RNTI has not been received: the MAC entity may consider the Random Access Response reception not successful; the MAC entity may increment PREAMBLE_TRANSMISSION_COUNTER by 1. In an example, if PREAMBLE_TRANSMISSION_COUNTER= preambleTransMax+1: if the Random Access Preamble is transmitted on the SpCell: the MAC entity may indicate a Random Access problem to upper layers; if this Random Access procedure was triggered for SI request: the MAC entity may consider the Random Access procedure unsuccessfully completed. Otherwise, if the Random Access Preamble is transmitted on a SCell: the MAC entity may consider the Random Access procedure unsuccessfully completed.

In an example, if the Random Access procedure is not completed: if in this Random Access procedure, the Random Access Preamble was selected by MAC among the contention-based Random Access Preambles: the MAC entity may select a random backoff time according to a uniform distribution between 0 and the PREAMBLE_BACKOFF; the MAC entity may delay the subsequent Random Access Preamble transmission by the backoff time.

In an example, the MAC entity may stop ra-ResponseWindow (and hence monitoring for Random Access Response(s)) after successful reception of a Random Access Response containing Random Access Preamble identifiers that matches the transmitted PREAMBLE_INDEX.

In an example, HARQ operation is not applicable to the Random Access Response transmission.

In an example, contention Resolution may be based on either C-RNTI on PDCCH of the SpCell or UE Contention Resolution Identity on DL-SCH.

In an example, once Msg3 is transmitted, the MAC entity may: start the ra-ContentionResolutionTimer and restart the ra-ContentionResolutionTimer at each HARQ retransmission in the first symbol after the end of the Msg3 transmission; the MAC entity may monitor the PDCCH while the ra-ContentionResolutionTimer is running regardless of the possible occurrence of a measurement gap.

In an example, if notification of a reception of a PDCCH transmission is received from lower layers: if the C-RNTI MAC CE was included in Msg3:if the Random Access procedure was initiated by the MAC sublayer itself or by the RRC sublayer and the PDCCH transmission is addressed to the C-RNTI and contains a UL grant for a new transmission; or if the Random Access procedure was initiated by a PDCCH order and the PDCCH transmission is addressed to the C-RNTI; or if the Random Access procedure was initiated for beam failure recovery and the PDCCH transmission is addressed to the C-RNTI: the MAC entity may consider this Contention Resolution successful; stop ra-ContentionResolutionTimer; discard the TEMPORARY_C-RNTI; consider this Random Access procedure successfully completed.

In an example, if the CCCH SDU was included in Msg3 and the PDCCH transmission is addressed to its TEMPORARY_C-RNTI: if the MAC PDU is successfully decoded: the MAC entity may stop ra-ContentionResolutionTimer. In an example, if the MAC PDU contains a UE Contention Resolution Identity MAC CE; and if the UE Contention Resolution Identity in the MAC CE matches the CCCH SDU transmitted in Msg3: the MAC entity may consider this Contention Resolution successful and finish the disassembly and demultiplexing of the MAC PDU; if this Random Access procedure was initiated for SI request: the MAC entity may indicate the reception of an acknowledgement for SI request to upper layers. Otherwise, the MAC entity may set the C-RNTI to the value of the TEMPORARY_C-RNTI; the MAC entity may discard the TEMPORARY_C-RNTI; the MAC entity may consider this Random Access procedure successfully completed. Otherwise, the MAC entity may discard the TEMPORARY_C-RNTI; and the MAC entity may consider this Contention Resolution not successful and discard the successfully decoded MAC PDU.

In an example, if ra-ContentionResolutionTimer expires: the MAC entity may discard the TEMPORARY_C-RNTI; the MAC entity may consider the Contention Resolution not successful.

In an example, if the Contention Resolution is considered not successful: the MAC entity may flush the HARQ buffer used for transmission of the MAC PDU in the Msg3 buffer; the MAC entity may increment PREAMBLE_TRANSMISSION_COUNTER by 1; if PREAMBLE_TRANSMISSION_COUNTER=preamble TransMax+1: the MAC entity may indicate a Random Access problem to upper layers. In an example, if this Random Access procedure was triggered for SI request: the MAC entity may consider the Random Access procedure unsuccessfully completed. In an example, if the Random Access procedure is not completed: the MAC entity may select a random backoff time according to a uniform distribution between 0 and the PREAMBLE_BACKOFF; the MAC entity may delay the subsequent Random Access Preamble transmission by the backoff time; and perform the Random Access Resource selection procedure.

In an example, upon completion of the Random Access procedure, the MAC entity may discard explicitly signaled contention-free Random Access Resources except contention-free Random Access Resources for beam failure recovery request, if any; and flush the HARQ buffer used for transmission of the MAC PDU in the Msg3 buffer.

In an example, a UE may be provided, for a serving cell, with a set $\bar{q}_0$ of periodic CSI-RS resource configuration indexes by higher layer parameter failureDetectionResources and with a set $\bar{q}_1$ of periodic CSI-RS resource configuration indexes and/or SS/PBCH block indexes by higher layer parameter candidateBeamRSList for radio link quality measurements on the serving cell. In an example, if the UE is not provided with higher layer parameter failureDetectionResources, the UE may determine the set $\bar{q}_0$ to include SS/PBCH block indexes and periodic CSI-RS resource configuration indexes with same values as the RS indexes in the RS sets indicated by the TCI states for respective control resource sets that the UE uses for monitoring PDCCH. In an example, the UE may expect the set $\bar{q}_0$ to include up to two RS indexes and, if there are two RS indexes, the set q may include RS indexes with QCL-TypeD configuration for the corresponding TCI states. In an example, the UE may expect single port RS in the set $\bar{q}_0$.

In an example, a threshold Qout,LR may correspond to a default value of higher layer parameter rlmInSyncOutOfSyncThreshold and to a value provided by higher layer parameter rsrp-ThresholdSSB, respectively.

In an example, the physical layer in the UE may assess the radio link quality according to the set $\bar{q}_0$ of resource configurations against the threshold Qout,LR. For the set $\bar{q}_0$, the UE may assess the radio link quality according to periodic CSI-RS resource configurations or SS/PBCH blocks that are quasi co-located, with the DM-RS of PDCCH receptions monitored by the UE. The UE may apply the Qin,LR threshold to the L1-RSRP measurement obtained from a SS/PBCH block. The UE may apply the Qin,LR threshold to the L1-RSRP measurement obtained for a CSI-RS resource after scaling a respective CSI-RS reception power with a value provided by higher layer parameter powerControlOffsetSS.

In an example, a physical layer in the UE may provide an indication to higher layers when a radio link quality for corresponding resource configurations in the set $\bar{q}_0$ that the UE uses to assess the radio link quality is worse than the threshold Qout,LR. The physical layer may inform the higher layers when the radio link quality is worse than the threshold Qout,LR with a periodicity determined by the maximum between the shortest periodicity of periodic CSI-RS configurations or SS/PBCH blocks in the set $\bar{q}_0$ that the UE uses to assess the radio link quality and 2 msec.

In an example, upon request from higher layers, the UE may provide to higher layers the periodic CSI-RS configuration indexes and/or SS/PBCH block indexes from the set $\bar{q}_1$ and the corresponding L1-RSRP measurements that are larger than or equal to the corresponding thresholds.

In an example, a UE may be provided with a control resource set through a link to a search space set provided by higher layer parameter recoverySearchSpaceId, for monitoring PDCCH in the control resource set. If the UE is provided higher layer parameter recoverySearchSpaceId, the UE may not expect to be provided another search space set for monitoring PDCCH in the control resource set associated with the search space set provided by recoverySearchSpaceId.

In an example, the UE may receive by higher layer parameter PRACH-ResourceDedicatedBFR, a configuration for PRACH transmission. In an example, for PRACH transmission in slot n and according to antenna port quasi co-location parameters associated with periodic CSI-RS configuration or SS/PBCH block with index $q_{new}$ provided by higher layers, the UE may monitor PDCCH in a search space provided by higher layer parameter recoverySearchSpaceId for detection of a DCI format with CRC scrambled by C-RNTI starting from slot n+4 within a window configured by higher layer parameter BeamFailureRecoveryConfig. For the PDCCH monitoring and for the corresponding PDSCH reception, the UE may assume the same antenna port quasi-collocation parameters with index qnew, until the UE receives by higher layers an activation for a TCI state or any of the parameters TCI-StatesPDCCH-ToAddlist and/or TCI-StatesPDCCH-ToReleaseList. In an example, after the UE detects a DCI format with CRC scrambled by C-RNTI in the search space provided by recoverySearchSpaceId, the UE may monitor PDCCH candidates in the search space provided by recoverySearchSpaceId until the UE receives a MAC CE activation command for a TCI state or higher layer parameters TCI-StatesPDCCH-ToAddlist and/or TCI-StatesPDCCH-ToReleaseList.

In an example, if the UE is not provided a control resource set for a search space set provided recoverySearchSpaceId or if the UE is not provided recoverySearchSpaceId, the UE may not expect to receive a PDCCH order triggering a PRACH transmission.

Figure 17:
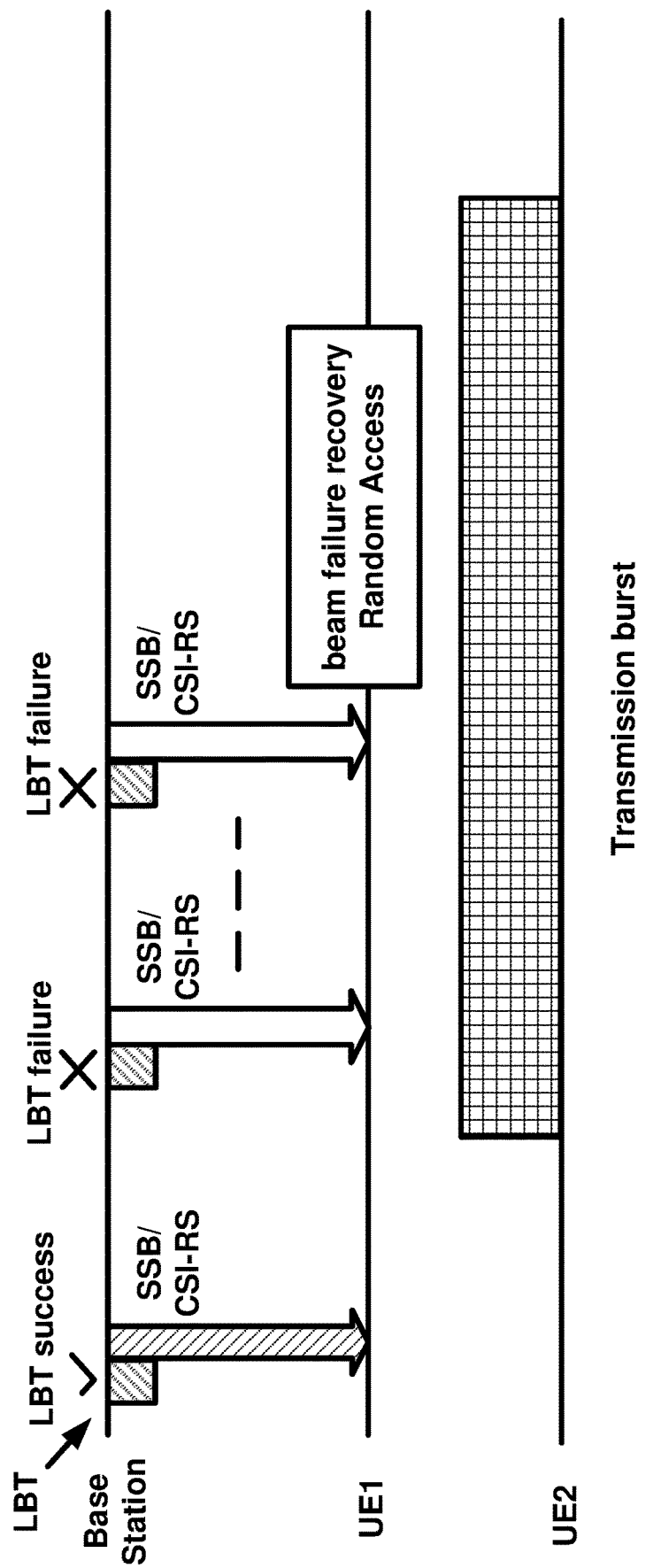
FIG. 17 is a diagram of example process as per an aspect of an embodiment of the present disclosure.

In legacy beam failure detection and recovery procedure, a wireless device detects a beam failure instance, for example, by detecting reference signals in downlink. The lower layer (e.g., PHY) indicates a beam failure instance by sending a beam failure instance indication to higher layers (e.g., MAC). The wireless device may start a beam failure recovery procedure by initiating a random access. Following the legacy procedures for beam failure detection and/or recovery on unlicensed bands lead to inefficiency. An example scenario is shown in FIG. 17. For example, a second wireless device may start transmission of a burst leading to channel access backoff and unsuccessful LBT by the base station or other wireless devices. The base station may not transmit the reference signals used for beam failure detection while the LBT is failing. The first wireless may continuously detect beam failure instances and send indication to the MAC layer. This may unnecessarily start a beam failure recovery procedure by the first wireless device. As the unlicensed spectrum is shared by the base station ad wireless devices, the base station may frequently encounter LBT failure and channel access deferral. This leads to a high frequency of beam failure recovery at the wireless devices an inefficient network performance including degraded throughput and latency performance. Example embodiments enhance the beam failure detection and recovery procedure on unlicensed bands.

In an example embodiment, a wireless device may receive one or more messages comprising configuration parameters. In an example, the one or more messages may comprise RRC messages. The one or more messages may comprise configuration parameters of a plurality of cells. In an example, the plurality of cells may comprise one or more unlicensed cells. In an example, the plurality of cells may comprise one or more licensed cells and one or more unlicensed cells. In an example, a licensed cell in the one or more licensed cells may comprise one or more first bandwidth parts. In an example, an unlicensed cell in the one or more unlicensed cells may comprise one or more second bandwidth parts. In an example, the wireless device may communicate with a base station employing one or more beams. In an example, the wireless device may receive downlink data (e.g., via a downlink data channel) and/or control information (e.g., via a downlink control channel) in a downlink beam. In an example the wireless device may be configured with a plurality of beams. The wireless device may communicate with a base station via one or more beams of the plurality of beams.

In an example, the one or more messages may comprise configuration parameters for beam failure detection. In an example, the one or more messages may comprise configuration parameters for radio link monitoring. The configuration parameters for radio link monitoring may comprise one or more configuration parameters for beam failure detection. In an example, a radio link monitoring config (e.g., RadioLinkMonitoringConfig) information element may be used to configure radio link monitoring for detection of beam and/or cell radio link failure. In an example, the beam failure detection configuration parameters may comprise a first timer value for a first timer (e.g., beam failure detection timer) and/or a first counter value (e.g., beam failure instance maximum count) for a first counter. The first counter value may indicate maximum number of beam failure instances before starting a beam failure recovery procedure.

In an example, the one or more messages may comprise configuration parameters for beam failure recovery. In an example, a beam failure recovery configuration information element (e.g., BeamFailureRecoveryConfig IE) may be used to configure a wireless device with RACH resources and/or candidate beams for beam failure recovery in case of beam failure detection.

In an example embodiment, lower layers (e.g., physical layer) may indicate to the upper/higher layers (e.g., MAC layer) of a beam failure instance. In an example, the beam failure instance may be determined by detecting/decoding one or more downlink signals (e.g., reference signals). The one or more downlink signals may comprise synchronization signal block (SSB) and/or CSI-RS and/or other signals. In an example, the wireless device may determine that a beam failure instance is caused by (is in response to) one or more received powers of the one or more downlink signals being smaller than one or more first values. In an example, the one or more first values may comprise one or more threshold values. In an example, the one or more first values may be RRC configured. In an example, the one or more first values may be pre-configured values. In an example, the one or more first values may be based on UE implementation and/or UE capability. In an example, the wireless device may determine that a beam failure instance is caused by (is in response to) decoding error rate of the one or more downlink signals being above one or more first decoding error values. The one or more first decoding error values may be pre-configured/configured by RRC/based on UE implementation.

In an example, the wireless device may determine that one or more listen-before-talk procedures for transmission of the one or more downlink signals are successful. In an example, the wireless device may determine that one or more listen-before-talk procedures for transmission of the one or more downlink signals are successful based on the one or more received powers of the one more downlink signals. In an example, the wireless device may determine that the one or more listen-before-talk procedures are successful in response to the one or more received powers of the one or more downlink signals (e.g., one or more powers detected on resources used for transmission of the one or more downlink signals) being above one or more second values. The one or more second values may be one or more threshold values (e.g., zero, one or more pre-configure values, noise floor, an offset to the noise floor, etc.). In an example, the wireless device may determine that the one or more listen-before-talk procedures are successful in response to the one or more downlink signals being present in the resources used for transmission of the one or more downlink signals.

Figure 18:
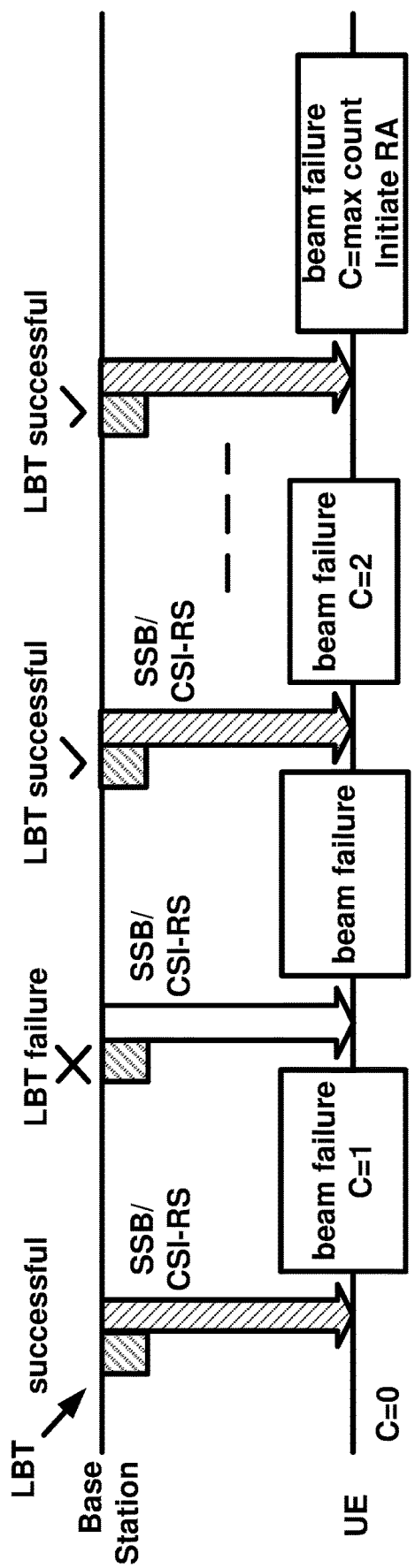
FIG. 18 is a diagram of example process as per an aspect of an embodiment of the present disclosure.

An example embodiment is shown in FIG. 18. In an example, in response to determining that beam failure instance has occurred (e.g., one or more received powers of the one or more downlink signals is less than the one or more first values) and that the one or more listen before talk procedure for transmission of the one or more downlink signals is successful, the wireless device may start the first timer (e.g., beam failure detection timer) with the first timer value. In an example, the lower layer (e.g., physical layer) of the wireless device may indicate to higher layer (e.g., MAC layer of the wireless device) a beam failure instance indication. In an example the wireless device may increment the first counter by one in response to the determining that beam failure instance has occurred (e.g., one or more received powers of the one or more downlink signals is less than the one or more first values) and that the one or more listen before talk procedure for transmission of the one or more downlink signals is successful and/or the one or more powers of the one or more signals is above one or more second values and/or the one or more downlink signals being present in the one or more resources used for transmission of the one or more downlink signals. In an example, an indication from lower layer to higher layer of the wireless device may indicate that the one or more listen before talk procedures for transmission of the one or more downlink signals are successful and/or the one or more powers of the one or more signals is above one or more second values and/or the one or more downlink signals are present in the one or more resources used for transmission of the one or more downlink signals.

Figure 19:
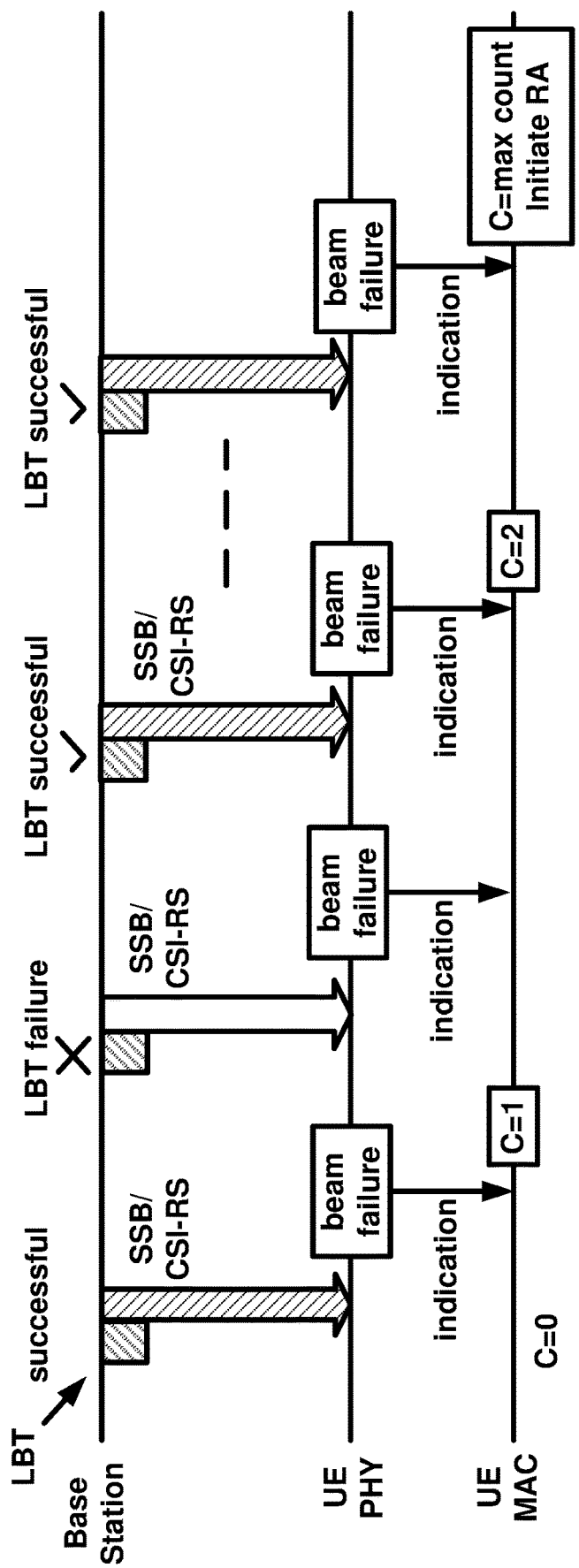
FIG. 19 is a diagram of example process as per an aspect of an embodiment of the present disclosure.

In an example embodiment in FIG. 19, the wireless device may determine that the one or more received signals of the one or more downlink signals are below the one or more first values. In response to the determining that the one or more listen-before-talk procedures for transmission of the one or more downlink signals are successful and/or in response to the determining that the one or more received powers of the one or more downlink signals are above the one or more second values and/or in response to the determining that the one or more downlink signals are present in the resources corresponding to the one or more downlink signals, the lower layer of the wireless device (e.g., physical layer) may indicate to the upper layer (e.g., MAC) that a beam failure instance has occurred. In an example embodiment, in response to the determining that the one or more listen-before-talk procedures for transmission of the one or more downlink signals are unsuccessful and/or in response to the determining that the one or more received powers of the one or more downlink signals are below the one or more second values and/or in response to the determining that the one or more downlink signals are not present/transmitted in the resources corresponding to the one or more downlink signals, the lower layer of the wireless device (e.g., physical layer) may not indicate to the upper layers (e.g., MAC) that a beam failure instance has occurred.

In an example, in response to the first counter reaching (e.g., having a value equal to or above) the first counter value (e.g., maximum number of beam failure instances), the wireless device may start/determine to start a beam failure recovery procedure if the beam failure recovery procedure is configured. The wireless device may start a second timer (e.g., beam failure recovery timer) if configured in response to starting the beam failure recovery procedure. In an example, the wireless device may receive configuration parameters for random access comprising configuration parameters for random access for beam failure recovery. In an example, in response to starting the beam failure recovery procedure, the wireless device may initiate random access process (e.g., on SpCell) by applying RRC configured parameters of random access for beam failure recovery (e.g., powerRampingStep, preambleReceivedTargetPower, and preambleTransMax configured in beamFailureRecoveryConfig). The wireless device may transmit a random access preamble in response to initiating the random access process.

In an example, in response to the first counter reaching (e.g., having a value equal to or above) the first counter value (e.g., maximum number of beam failure instances), the wireless may start/determine to start a random access process (e.g., on SpCell) if the beam failure recovery procedure is not configured. In an example, the wireless device may receive configuration parameters for random access comprising configuration parameters for normal random access. The random process may employ the configured random access configuration parameters for normal random access. The wireless device may transmit a random access preamble in response to starting/determining to start the random access process.

In an example, if the random access procedure is successfully completed, the wireless device may stop the second timer (e.g., beam failure recovery timer). The wireless device may consider the beam failure recovery procedure successfully completed in response to the successful completion of the random access process.

In an example, the wireless device may reset (e.g., set to zero) the first counter in response to the first timer (e.g., beam failure detection timer) expiring. In an example, if the wireless device does not receive a beam failure instance indication while the first timer is running, the timer may expire and the counter value may be reset. If the duration between two beam failure instances is larger the first timer value, a value of the first counter remains at zero or one and/or may not reach the first counter value (e.g., maximum number of beam failure instance indications).

In an example, the one or more messages may comprise first beam failure detection configuration parameters indicating a first timer value for a first timer (e.g., a first beam failure detection timer). In an example, the first beam failure detection configuration parameters may indicate a first counter value (e.g., a first maximum beam failure instance) for a first counter. In an example, the one or more messages may comprise second beam failure detection configuration parameters indicating a second timer value for a second timer (e.g., a second beam failure detection timer). In an example, the second beam failure detection configuration parameters may indicate a second counter value (e.g., a second maximum beam failure instance) for a second counter. The wireless device may determine a beam failure instance based on one or more downlink signals. The one or more downlink signals may comprise one or more reference signals. The one or more reference signals may comprise synchronization signals (e.g., SSB) and/or CSI-RS. The wireless device may determine a beam failure instance in response to one or more powers of the one or more downlink signals being smaller than one or more first values. The one or more first values may be RRC configured and/or preconfigured and/or may be based on UE implementation and/or UE capability. In an example, lower layers (e.g., physical layer) of the wireless device may send a beam failure instance indication to higher layers (e.g., MAC) in response to the determining the beam failure instance.

Figure 20:
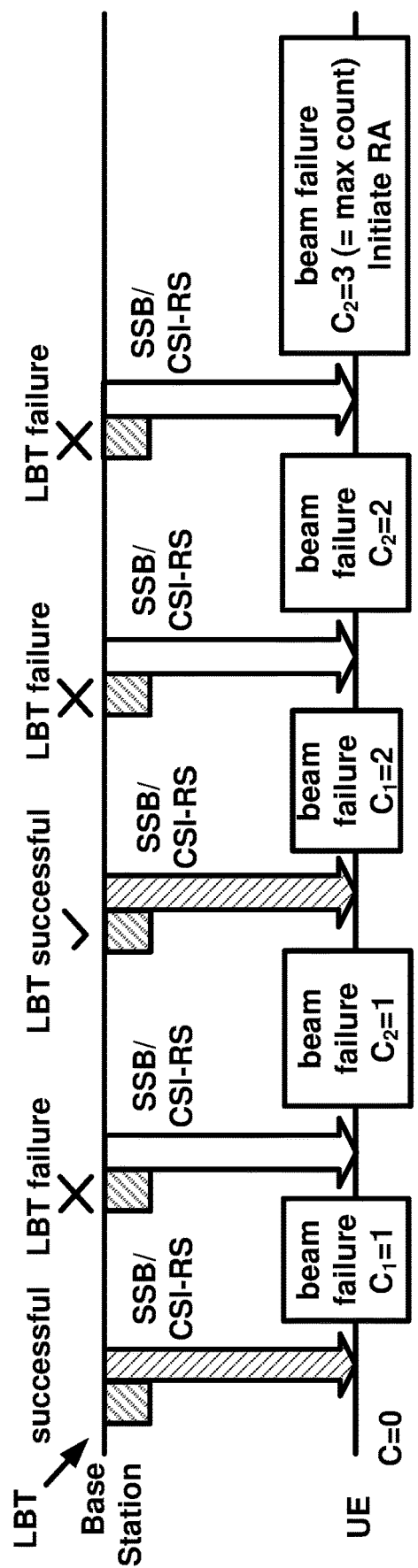
FIG. 20 is a diagram of example process as per an aspect of an embodiment of the present disclosure.
Figure 21:
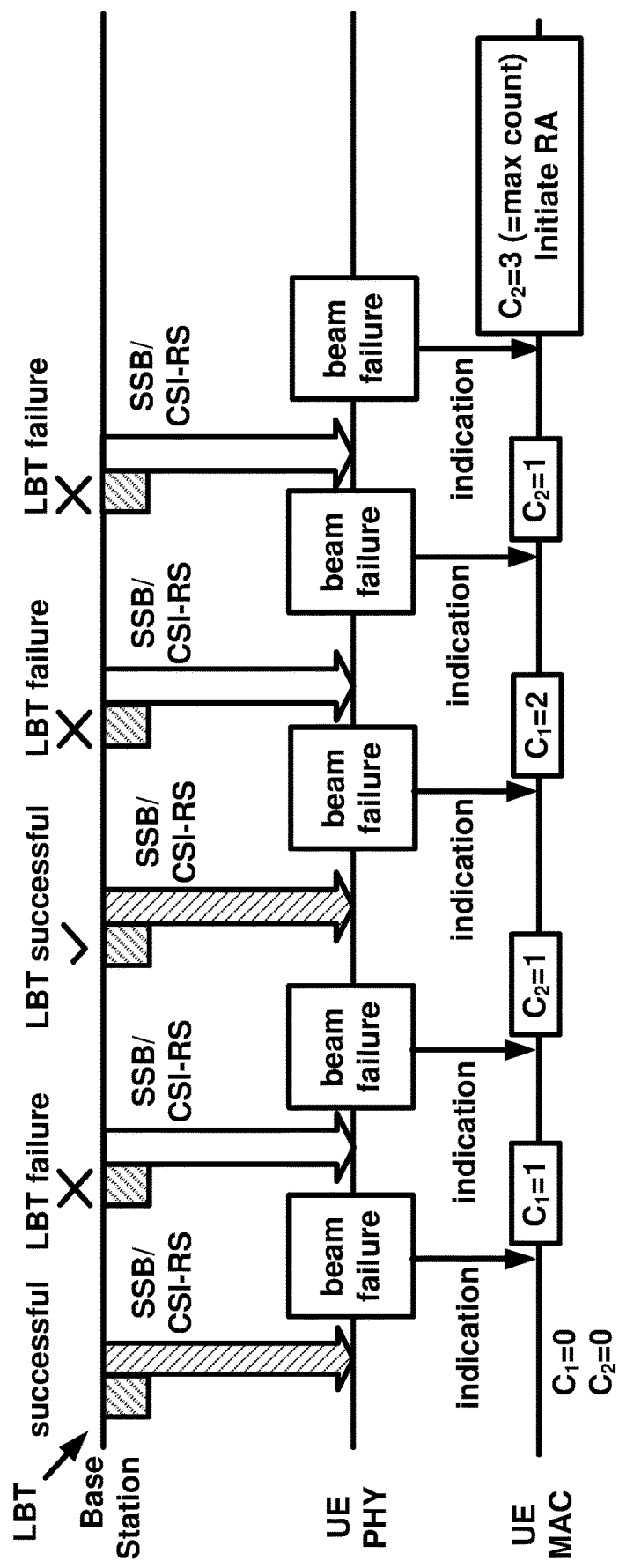
FIG. 21 is a diagram of example process as per an aspect of an embodiment of the present disclosure.

In an example embodiment shown in FIG. 20, in response to the determining the beam failure instance (e.g., receiving beam failure instance indication from lower layers), the wireless device may increment one of the first counter or the second counter based on one or more listen-before-talk procedures for transmission of the one or more downlink signals and/or one or more received powers of the one or more downlink signals and/or detecting presence or absence of the one or more downlink signals (e.g., in resources associated with the one or more downlink signals). In an example and as shown in FIG. 21, the lower layers may indicate to the higher layers whether a beam failure instance is caused by failure of one or more listen-before-talk procedures for transmission of the one or more downlink signals and/or one or more received powers of the one or more downlink signals being smaller than the one or more second values and/or absence of the one or more downlink signal (e.g., in resources associated with the one or more downlink signals).

In an example, the wireless device may increment the first counter in response to determining the beam failure instance (e.g., receiving beam failure instance indication from lower layers) and the one or more listen-before-talk procedures for transmission of the one or more downlink signals indicating clear channel/being successful and/or one or more received powers of the one or more downlink signals being above the one or more second values and/or detecting presence of the one or more downlink signals in resources associated with the one or more downlink signals. In an example, lower layer (e.g., physical layer) may send an indication to the upper layer (e.g., MAC layer) indicating that the one or more listen-before-talk procedures for transmission of the one or more downlink signals indicate clear channel/are successful and/or one or more received powers of the one or more downlink signals are above the one or more second values and/or the one or more downlink signals are present (e.g., in resources associated to the one or more downlink signals).

In an example, the wireless device may increment the second counter in response to determining the beam failure instance (e.g., receiving beam failure instance indication from lower layers) and the one or more listen-before-talk procedures for transmission of the one or more downlink signals indicating busy/occupied channel/being unsuccessful and/or one or more received powers of the one or more downlink signals being below the one or more second values and/or detecting absence of the one or more downlink signals in resources associated with the one or more downlink signals. In an example, the lower layer (e.g., physical layer) may send an indication to the upper layer (e.g., MAC layer) indicating that the one or more listen-before-talk procedures for transmission of the one or more downlink signals indicate occupied/busy channel/are unsuccessful and/or one or more received powers of the one or more downlink signals are below the one or more second values and/or the one or more downlink signals are absent (e.g., in resources associated with the one or more downlink signals).

In an example embodiment, in response to the determining the beam failure instance (e.g., receiving beam failure instance indication from lower layers), the wireless device may start/restart one of the first timer (e.g., first beam failure detection timer) or the second timer (e.g., second beam failure detection timer) based on one or more listen-before-talk procedures for transmission of the one or more downlink signals and/or one or more received powers of the one or more downlink signals and/or detecting presence or absence of the one or more downlink signals (e.g., in resources associated with the one or more downlink signals).

In an example, the wireless device may start/restart the first timer (e.g., first beam failure detection timer) in response to determining the beam failure instance (e.g., receiving beam failure instance indication from lower layers) and the one or more listen-before-talk procedures for transmission of the one or more downlink signals indicating clear channel/being successful and/or one or more received powers of the one or more downlink signals being above one or more second values and/or detecting presence of the one or more downlink signals (e.g., in resources associated with the one or more downlink signals).

In an example, the wireless device may start/restart the second timer (e.g., second beam failure detection timer) in response to determining the beam failure instance (e.g., receiving beam failure instance indication from lower layers) and the one or more listen-before-talk procedures for transmission of the one or more downlink signals indicating busy/occupied channel/being unsuccessful and/or one or more received powers of the one or more downlink signals being above one or more second values and/or detecting presence of the one or more downlink signals (e.g., in resources associated with the one or more downlink signals).

In an example, the wireless device may determine that the one or more listen-before-talk procedures for transmission of the one or more downlink signals are successful in response to the one or more received powers of the one or more downlink signals (e.g., one or more powers detected on resources used for transmission of the one or more downlink signals) being above one or more second values. The one or more second values may be threshold values (e.g., zero, one or more pre-configure values, noise floor, an offset to the noise floor, etc.). In an example, the wireless device may determine that the one or more listen-before-talk procedures are successful in response to the one or more downlink signals being present in the resources used for transmission of the one or more downlink signals.

In an example, the wireless device may determine that the one or more listen-before-talk procedures for transmission of the one or more downlink signals are unsuccessful in response to the one or more received powers of the one or more downlink signals (e.g., one or more powers detected on resources used for transmission of the one or more downlink signals) being below one or more second values. The one or more second values may be threshold values (e.g., zero, one or more pre-configure values, noise floor, an offset to the noise floor, etc.). In an example, the wireless device may determine that the one or more listen-before-talk procedures are unsuccessful in response to the one or more downlink signals not being present in the resources used for transmission of the one or more downlink signals.

In an example embodiment, the wireless device may determine to start a beam failure recovery procedure and/or a random access process based on a value of the first counter and/or a value of the second counter. In an example, the wireless device may determine to start a beam failure recovery procedure and/or a random access process in response to the first counter reaching (having a value equal or above) the first counter value or the second counter reaching (having a value equal or above) the second counter value.

In an example, the wireless device may start a third timer (e.g., beam failure recovery timer) if configured in response to starting the beam failure recovery procedure. The wireless device may receive configuration parameters for random access, the configuration parameters of random access may comprise configuration parameters for random access for beam failure recovery. The wireless device may initiate random access procedure (e.g., on SpCell) by applying RRC configured parameters of random access for beam failure recovery (e.g., powerRampingStep, preambleReceivedTargetPower, and preambleTransMax configured in beamFailureRecoveryConfig). The wireless device may transmit a random access preamble in response to initiating the random access process.

In an example, the wireless may start/determine to start a random access process (e.g., on SpCell) if the beam failure recovery procedure is not configured. The wireless device may receive configuration parameters for random access, the configuration parameters of random access may comprise configuration parameters for normal random access. The wireless device may transmit a random access preamble in response to starting/determining to start the random access process.

In an example, if the random access procedure is successfully completed, the wireless device may stop the third timer (e.g., beam failure recovery timer). The wireless device may consider the beam failure recovery procedure successfully completed in response to the successful completion of the random access process.

In an example, the wireless device may reset (e.g., set to zero) the first counter and/or the second counter in response to the first timer (e.g., first beam failure detection timer) and/or the second timer (e.g., second beam failure detection timer) expiring. In an example, the wireless device may reset (e.g., set to zero) the first counter in response to the first timer (e.g., first beam failure detection timer) expiring. In an example, the wireless device may reset (e.g., set to zero) the second counter in response to the second timer (e.g., first beam failure detection timer) expiring.

Figure 22:
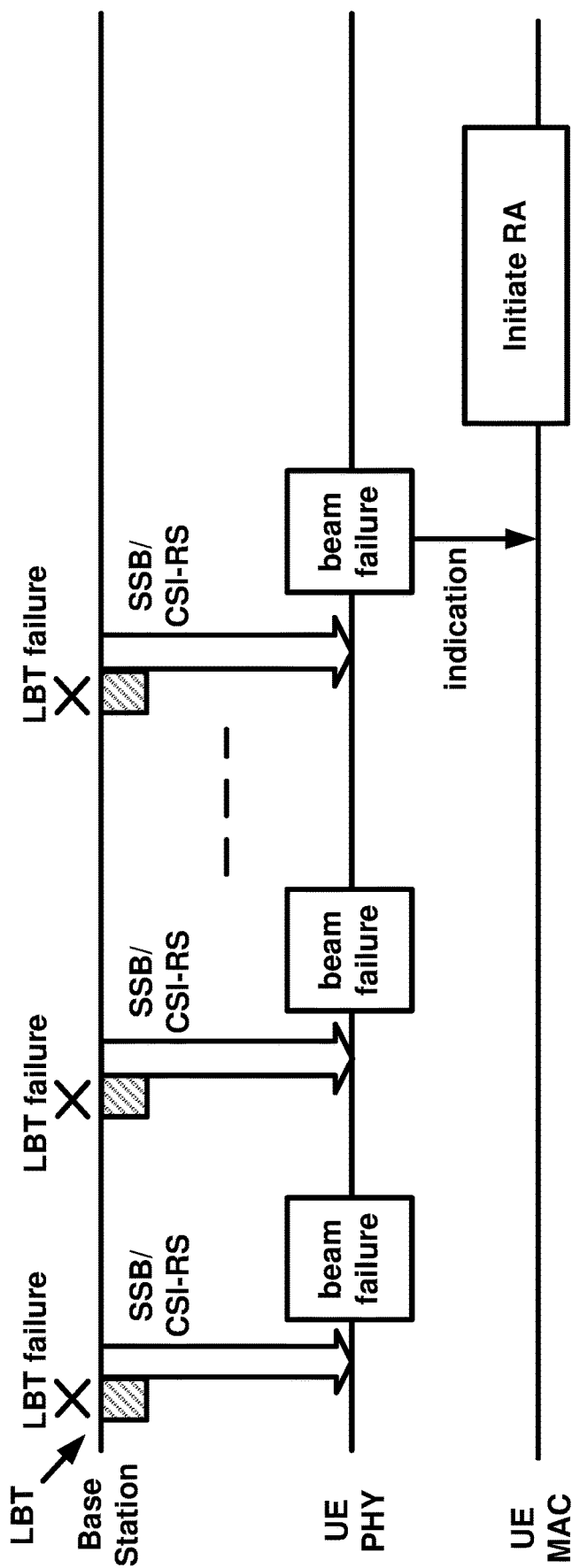
FIG. 22 is a diagram of example process as per an aspect of an embodiment of the present disclosure.

In an embodiment shown in FIG. 22, a lower layer (e.g., physical layer) of a wireless device may determine a need for beam failure recovery procedure and may indicate (e.g., send an indication) to the upper layer (e.g., MAC layer) to start the beam failure recovery procedure. The wireless device may employ one or more counters and/or one or more timers to determine the need for the beam failure recovery and send the indication to a higher layer (e.g., MAC layer) of the wireless device to start the beam failure recovery procedure and/or random access process. In an example, the higher layer (e.g., MAC layer) of the wireless device may start the beam failure recovery procedure and/or the random access process in response to receiving the indication from the lower layers.

In an example embodiment, the wireless device may start a beam failure recovery procedure and/or random access process in response to the wireless device determining that the one or more listen-before-talk procedures for transmission of the one or more downlink signals are unsuccessful for a first number of times. In an example, the wireless device may start a beam failure recovery procedure and/or random access process in response to the wireless device determining that the one or more listen-before-talk procedures for transmission of the one or more downlink signals are unsuccessful for a first number of consecutive times. In an example, the first number may be pre-configured. In an example, the first number may be configured by RRC configuration. In an example, the RRC configuration parameters may indicate the first number. In an example, lower layers (e.g., physical layer) of the wireless device may indicate and/or send an indication to higher layers (e.g., MAC layer) to start a beam failure recovery procedure and/or random access process in response to the wireless device determining that the one or more listen-before-talk procedures for transmission of the one or more downlink signals are unsuccessful for a first number of times and/or for a first number of consecutive times.

In an embodiment, a wireless device may employ a process comprising receiving configuration parameters for beam failure detection and beam failure recovery. In an example, the configuration parameters may indicate a first counter value for a first counter. In an example, the configuration parameters may indicate a first timer value for a first timer. The wireless device may determine a beam failure instance. In an example, the determining the beam failure instance may be in response to one or more received powers of the one or more downlink signals being less than one or more thresholds and one or more listen-before-talk procedures for transmission of the one or more downlink signals being successful. In an example, the one or more downlink signals may comprise one or more reference signals. In an example, the one or more reference signals may comprise SSB and/or CSI-RS. In an example, the determining the beam failure instance may be in response to one or more received powers of the one or more downlink signals being less than one or more thresholds and the one or more downlink signals being absent (e.g., not occupying resources corresponding to the one or more downlink signals). In an example, the determining the beam failure instance may be in response to one or more received powers of the one or more downlink signals being less than one or more thresholds and the one or more received powers of the one or more downlink signals being above one or more second threshold values. In an example, the wireless device may start the first timer with the first timer value. The wireless device may increment the first counter in response to the determining. The wireless device may start/determine to start a beam failure recovery procedure/a random access process in response to the first counter reaching the first counter value. The wireless device may transmit a random access preamble in response to the determining/starting the beam failure procedure/the random access process.

In an example embodiment, a wireless device may employ a process comprising receiving one or more messages comprising first configuration parameters and second configuration parameters. In an example, the first configuration parameters may indicate a first timer value for a first timer and a first counter value for a first counter. In an example, the second configuration parameters may indicate a second timer value for a second timer and a second counter value for a second counter.

The wireless device may determine a beam failure instance based on one or more downlink signals. In an example, the determining the beam failure instance may be in response to one or more received powers of the one or more downlink signals being less than one or more thresholds and one or more listen-before-talk procedures for transmission of the one or more downlink signals being successful. In an example, the one or more downlink signals may comprise one or more reference signals. In an example, the one or more reference signals may comprise SSB and/or CSI-RS. In an example, the determining the beam failure instance may be in response to one or more received powers of the one or more downlink signals being less than one or more thresholds and the one or more downlink signals being absent (e.g., not occupying resources corresponding to the one or more downlink signals). In an example, the determining the beam failure instance may be in response to one or more received powers of the one or more downlink signals being less than one or more thresholds and the one or more received powers of the one or more downlink signals being above one or more second threshold values.

In an example, the wireless device may increment/determine to increment one of the first counter or the second counter based on one or more listen-before talk procedures for transmission of the one or more downlink signals and/or based on received power of the one or more downlink signals and/or based on presence or absence of the one or more received signals (e.g., presence or absence of the one or more received signals in resources associated with the one or more received signals). In an example, the wireless device may increment the first counter in response to the one or more listen-before talk procedures for transmission of the one or more downlink signals being successful and/or the received power of the one or more downlink signals being above the one or more second values and/or presence of the one or more received signals (e.g., presence of the one or more received signals in resources associated with the one or more received signals). In an example, the wireless device may increment the second counter in response to the one or more listen-before talk procedures for transmission of the one or more downlink signals being unsuccessful and/or the received power of the one or more downlink signals being below the one or more second values and/or absence of the one or more received signals (e.g., absence of the one or more received signals in resources associated with the one or more received signals).

In an example, the wireless device may start/determine to start one of the first timer with the first timer value or the second timer with the second timer value based on the one or more listen-before-talk procedures for transmission of the one or more downlink signals and/or based on received power of the one or more downlink signals and/or based on presence or absence of the one or more received signals (e.g., presence or absence of the one or more received signals in resources associated with the one or more received signals). In an example, the wireless device may start the first timer in response to the one or more listen-before talk procedures for transmission of the one or more downlink signals being successful and/or the received power of the one or more downlink signals being above the one or more second values and/or presence of the one or more received signals (e.g., presence of the one or more received signals in resources associated with the one or more received signals). In an example, the wireless device may increment the second counter in response to the one or more listen-before talk procedures for transmission of the one or more downlink signals being unsuccessful and/or the received power of the one or more downlink signals being below the one or more second values and/or absence the one or more received signals (e.g., absence of the one or more received signals in resources associated with the one or more received signals).

A wireless device may be configured by RRC with a beam failure recovery procedure. Beam failure recovery procedure is for reconfiguring an existing RRC connection. The wireless device may maintain its RRC connection with the base station before and after a beam failure recovery procedure. A physical layer of a wireless device may detect beam failure instances based on one or more downlink reference signals (e.g., SSB or CSI-RS) and may indicate the beam failure instances to a MAC layer of the wireless device. The wireless device may declare beam failure when a number of beam failure instance indications from the physical layer reaches a configured threshold before a configured timer expires. The wireless device may reconfigure a link based on the beam failure recovery procedure. The beam failure detection and recovery procedures are different from radio link failure detection and recovery. A wireless device may release an existing connection and start a new RRC Connection with the same or different base station based on radio link failure. A wireless device may perform Radio Link Monitoring (RLM) in an active BWP based on reference signals (e.g., SSB or CSI-RS) and signal quality thresholds configured by the network.

The beam failure detection and recovery procedures are initiated by a MAC layer of the wireless device. The beam operations are more dynamic and change more quickly than cell operations. The counters or timers for beam failure detection and recovery procedures may be managed at the MAC layer. The radio link failure detection and recovery procedures are initiated by an RRC layer of the wireless device. The counters or timers for these procedures may be managed at the RRC layer. The beam failure detection and recovery procedures are faster compared to the radio link failure detection and recovery processes since MAC layer procedures are faster compared to RRC layer procedures.

In unlicensed band operation, transmissions of the downlink reference signals are subject to successful listen before talk procedures. The base station may transmit the downlink reference signals based on the listen before talk procedure indicating a clear channel. A transmission burst with long duration may block the transmissions of one or more downlink reference signals. Implementation of existing technologies for beam failure recovery may result in a wireless device overestimating the number of beam failure instances. For example, the wireless device may determine a beam failure instance due to listen before talk failure for transmission of a downlink reference signal at the base station. The wireless device may unnecessarily declare beam failure and initiate a beam failure recovery procedure due to consistent LBT failures for transmission of the downlink reference signals. There is a need to enhance the existing beam failure detection and recovery processes in unlicensed bands. Example embodiments enhance the existing beam failure detection and recovery processes by taking into account the listen before talk processes for transmission of the downlink reference signals. Example embodiments enhances beam failure detection and recovery procedure for an unlicensed cell by reducing a probability of false beam failure detection. Example embodiments increases radio link efficiency and wireless device battery power consumption.

Figure 23:
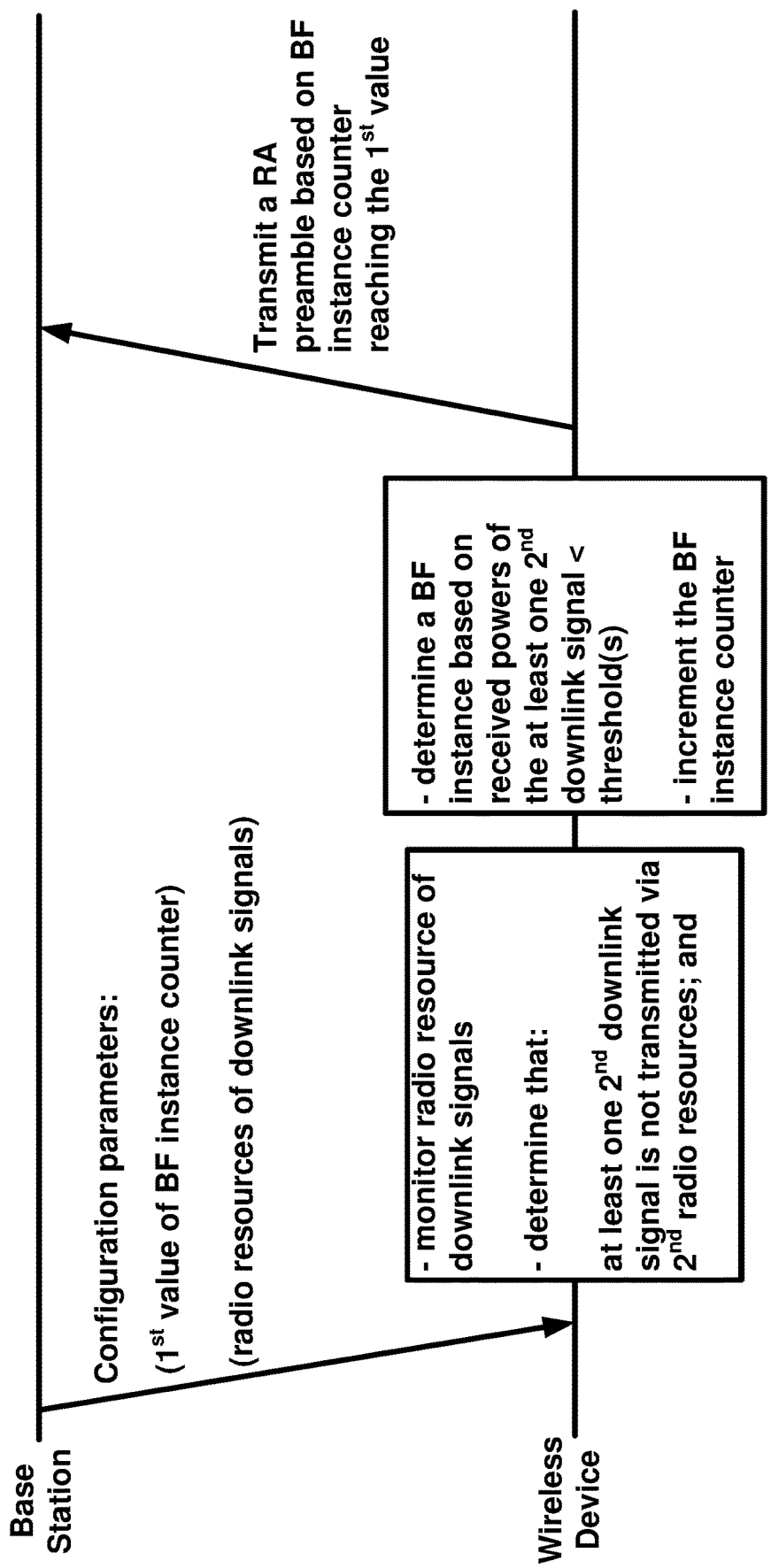
FIG. 23 is an example beam failure recovery process as per an aspect of an embodiment of the present disclosure.

In an example embodiment as shown in FIG. 23, a wireless device may receive one or more messages (e.g., one or more RRC messages) comprising configuration parameters. The configuration parameters may indicate a first value of a beam failure instance counter. The beam failure instance counter may be a MAC layer counter used in beam failure detection and recovery procedures. The configuration parameters may further indicate radio resources of a plurality of downlink signals. The plurality of downlink signals may be used for beam failure detection. The wireless device may determine a beam failure instance based on a received power of a downlink reference signal. In an example, the configuration parameters may further comprise a threshold power for comparing a received power of the downlink reference signal with the threshold power. The wireless device may monitor the radio resources for the plurality of downlink reference signals. In an example, the plurality of downlink signals may comprise one or more SSBs. In an example, the plurality of downlink signals may comprise one or more CSI-RS reference signals. The wireless device may measure the received powers of the plurality of downlink signals and/or may detect the plurality of downlink reference signals by comparing them with pre-defined transmission structures.

Figure 24:
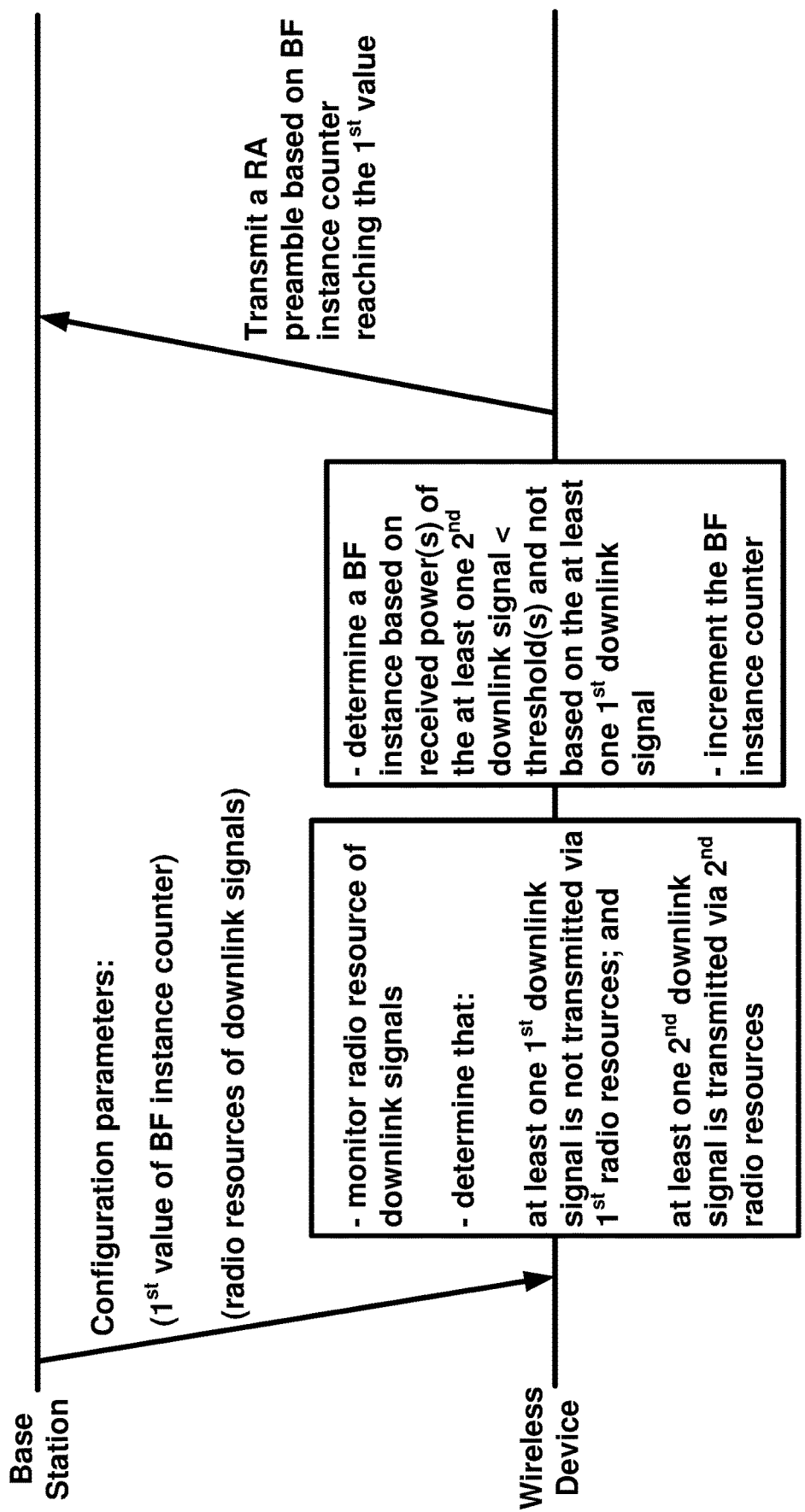
FIG. 24 is an example beam failure recovery process as per an aspect of an embodiment of the present disclosure.

The wireless device may, based on the monitoring, determine that at least one first downlink signal of the plurality of downlink signals is not transmitted via at least one first radio resource of the radio resources. In an example as shown in FIG. 24, the wireless device may further determine, based on the monitoring, that at least one second downlink signal of the plurality of downlink signals is transmitted via at least one second resource of the radio resources. The wireless device may determine a beam failure instance based on one or more received powers of the at least one second downlink signal. The wireless device may increment a beam failure instance counter based on the determining the beam failure instance. The wireless device may transmit a random access preamble based on the beam failure instance counter reaching the first value. In an example as shown in FIG. 24, the determining the beam failure instance may not be based on the at least one first downlink signal.

Figure 25:
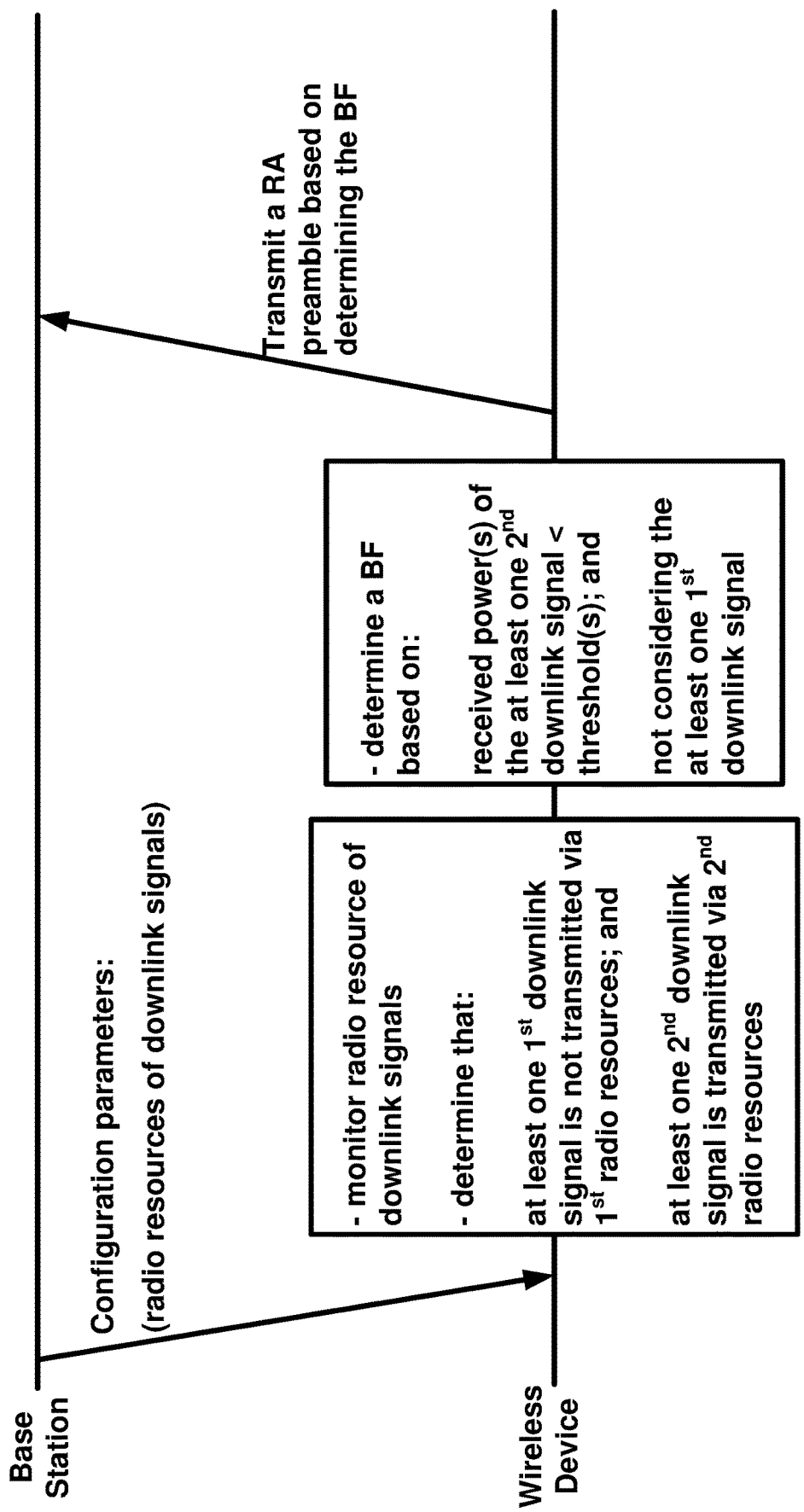
FIG. 25 is an example beam failure recovery process as per an aspect of an embodiment of the present disclosure.

In an example embodiment as shown in FIG. 25, the wireless device may determine a beam failure based on one or more received powers of the at last one second downlink signal being less than one or more thresholds and based on not considering the at least one first downlink signal. The wireless device may transmit a random access preamble based on the determining the beam failure.

Figure 26:
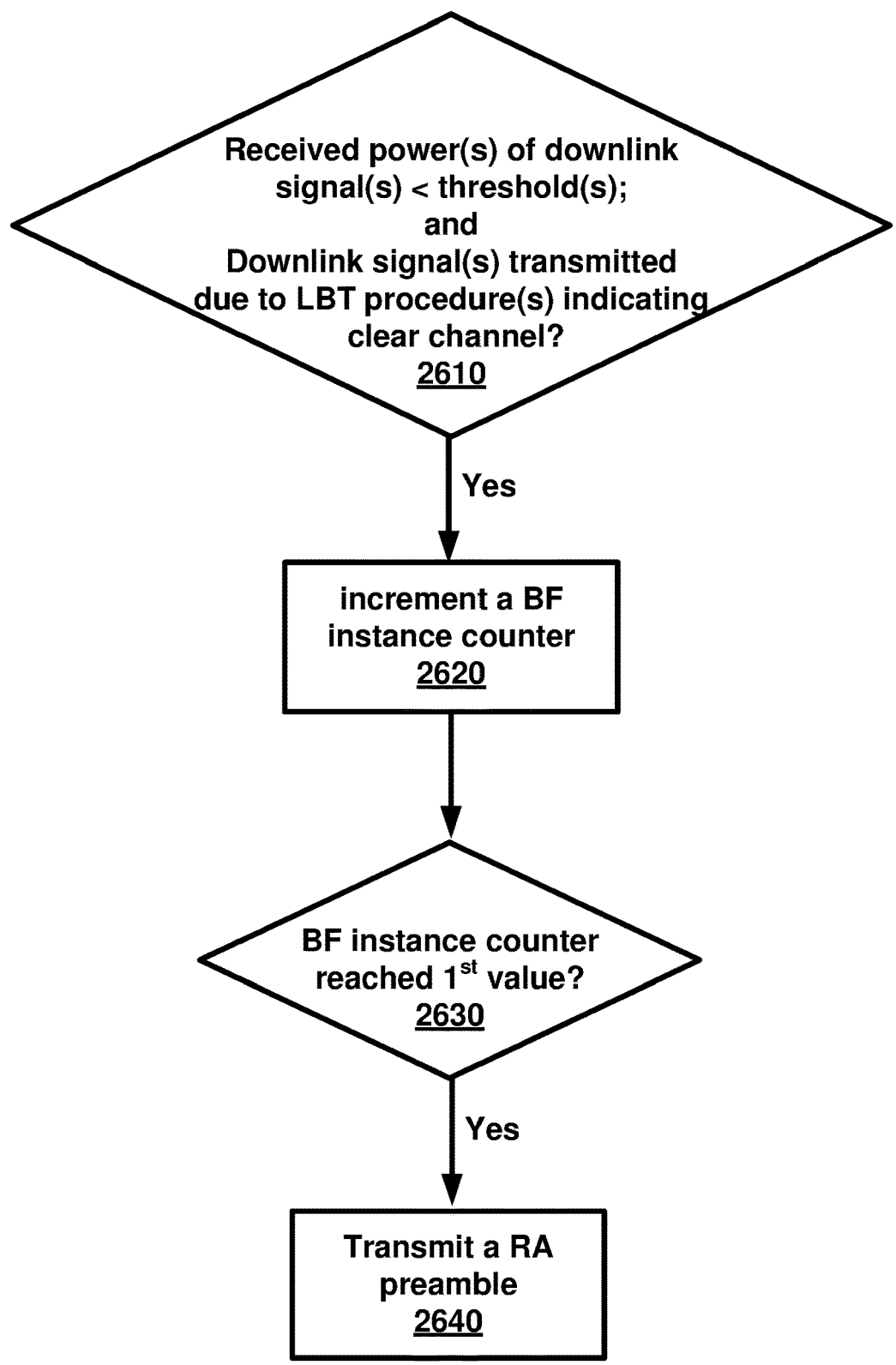
FIG. 26 is an example flow diagram of an aspect of an embodiment of the present invention disclosure.

FIG. 26 is a flow diagram as per an aspect of an example embodiment of the present disclosure. At 2610, a wireless device may determine: whether one or more received powers of one or more downlink signals are less than one or more thresholds; and the one or more downlink signals are transmitted due to one or more LBT procedures indicating clear channel. At 2620, the wireless device may increment a beam failure instance counter based on determining that the one or more received powers of one or more downlink signals are less than one or more thresholds; and that the one or more downlink signals are transmitted due to one or more LBT procedures indicating clear channel. At 2630, the wireless device may determine whether the beam failure instance counter reached the first value. At 2640, the wireless device may transmit a random access preamble based on determining that the beam failure instance counter reached the first value.

According to an example embodiment, the configuration parameters indicate the first value.

According to an example embodiment, the wireless device may start the beam failure recovery timer with a second value, based on the beam failure instance counter reaching the first value. According to an example embodiment, the configuration parameters may indicate the second value.

According to an example embodiment, the wireless device may start a beam failure detection timer, with a third value, based on: the one or more received powers of the one or more downlink signals being less than the one or more threshold values; and the determining that the one or more downlink signals are transmitted due to the one or more downlink listen before talk procedures indicating clear channel. According to an example embodiment, the configuration parameters may indicate the third value.

According to an example embodiment, the one or more downlink signals may comprise a synchronization signal block.

According to an example embodiment, the one or more downlink signals may comprise a channel state information reference signal.

According to an example embodiment, the determining a beam failure instance may comprise an indication from a physical layer to a medium access control layer.

According to an example embodiment, the transmitting the random access preamble may be for a beam failure recovery.

According to an example embodiment, the determining that the one or more downlink signals are transmitted, due to the one or more downlink listen before talk procedures indicating clear channel, may be based on one or more second threshold values.

According to an example embodiment, the determining that the one or more downlink signals are transmitted, due to the one or more downlink listen before talk procedures indicating clear channel, may be based on the one or more downlink signal being present in their one or more radio resources of the one or more downlink signals.

In an example embodiment, a wireless device may receive configuration parameters indicating: a first value of a beam failure instance counter; and radio resources of a plurality of downlink signals. The wireless device may monitor the radio resources of the plurality of downlink signals. The wireless device may determine, based on the monitoring, that: at least one first downlink signal of the plurality of downlink signals is not transmitted via at least one first radio resource of the radio resources; and at least one second downlink signal of the plurality of downlink signals is transmitted via at least one second radio resource of the radio resources. The wireless device may determine a beam failure instance based on one or more received powers of the at least one second downlink signal being less than one or more threshold values. The wireless device may increment the beam failure instance counter based on the determining the beam failure instance. The wireless device may transmit a random access preamble based on the beam failure instance counter reaching the first value.

According to an example embodiment, the determining the beam failure instance is not based on the at least one first downlink signal. According to an example embodiment the wireless device may further start a beam failure recovery timer, with a second value, based on the beam failure instance counter having the first value. According to an example embodiment, the configuration parameters indicate the second value. According to an example embodiment, the wireless device may start a beam failure detection timer, with a third value, based on the determining the beam failure instance. According to an example embodiment, the configuration parameters may indicate the third value. According to an example embodiment, the plurality of downlink signals may comprise a synchronization signal block. According to an example embodiment, the plurality of downlink signals may comprise a channel state information reference signal. According to an example embodiment, the wireless device may determine that the at least one first downlink signal is not transmitted due to one or more first downlink listen before talk procedures indicating busy channel. According to an example embodiment, the wireless device may determine that the at least one second downlink signal is transmitted due to one or more second downlink listen before talk procedures indicating clear channel. According to an example embodiment, the determining the beam failure instance may comprise an indication from a physical layer to a medium access control layer. According to an example embodiment, the transmitting the random access preamble may be for beam failure recovery. According to an example embodiment, the determining that the at least one first downlink signal of the plurality of downlink signals is not transmitted may be based on one or more second threshold values. According to an example embodiment, the determining that at least one first downlink signal of the plurality of downlink signals is not transmitted may be based on the at least one first downlink signal not being present in the at least one first radio resource. According to an example embodiment, the determining that the at least one second downlink signal of the plurality of downlink signals is transmitted may be based on one or more second threshold values. According to an example embodiment, the determining that at least one second downlink signal of the plurality of downlink signals is transmitted may be based on the at least one second downlink signal being present in the at least one second radio resource.

In an example embodiment, a wireless device may receive configuration parameters indicating: a first value of a beam failure instance counter; and radio resources of a plurality of downlink signals. The wireless device may determine whether at least one second downlink signal of the plurality of downlink signals is transmitted via at least one second radio resource of the radio resources. The wireless device may determine a beam failure instance based on: the determining indicating that the at least one second downlink signal is transmitted; and one or more received powers of the at least one second downlink signals being less than one or more threshold values. The wireless device may increment the beam failure instance counter based on the determining the beam failure instance. The wireless device may transmit a random access preamble based on the beam failure instance counter reaching the first value.

According to an example embodiment, the wireless device may determine whether at least one first downlink signal of the plurality of downlink signals is not transmitted via at least one first radio resource of the radio resources. The determining the beam failure instance may not be based on the at least one first downlink signals based on the determining indicating that the at least one first downlink signal is not transmitted. According to an example embodiment, the wireless device may determine that the at least one first downlink signal of the plurality of downlink signals is not transmitted due to one or more first downlink listen before talk procedures indicating a busy channel. According to an example embodiment, the wireless device may determine that the at least one second downlink signal of the plurality of downlink signals is transmitted due to one or more second downlink listen before talk procedures indicating a clear channel.

In an example embodiment, a wireless device may receive configuration parameters indicating radio resources of a plurality of downlink signals. The wireless device may monitor the plurality of downlink signals of the radio resources. The wireless device may determine, based on the monitoring, that at least one first downlink signal of the plurality of downlink signals is not transmitted via at least one first radio resource of the radio resources; and at least one second downlink signal of the plurality of downlink signals is transmitted via at least one second radio resource of the radio resources. The wireless device may determine a beam failure based on: one or more received powers of the at least one second downlink signals being less than one or more threshold values; and not considering the at least one first downlink signal.

According to an example embodiment, the determining the beam failure may be based on a beam failure instance counter reaching a first value; and the configuration parameters may indicate the first value. According to an example embodiment, the determining the beam failure may be based on determining a beam failure instance based on: on one or more received powers of the at least one second downlink signal being less than one or more threshold values; and not considering the at least one first downlink signal. According to an example embodiment, the wireless device may increment a beam failure instance counter based on the determining the beam failure instance. According to an example embodiment, the wireless device may determine that the at least one first downlink signal of the plurality of downlink signals is not transmitted due to one or more first downlink listen before talk procedures indicating a busy channel. According to an example embodiment, the wireless device may determine that the at least one second downlink signal of the plurality of downlink signals is transmitted due to one or more second downlink listen before talk procedures indicating a clear channel.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
 receiving, by a wireless device, configuration parameters indicating:
  a first value of a beam failure instance counter; and
  a radio resource of a downlink signal;

determining the downlink signal is transmitted via the radio resource based on one or more downlink listen before talk procedures for transmission of the downlink signal being successful in response to a received power of the downlink signal exceeding a first threshold value;

determining a beam failure instance based on:
  the determining the downlink signal is transmitted; and
  the received power of the downlink signal being less than a threshold value;

incrementing the beam failure instance counter based on the determining the beam failure instance; and transmitting a beam failure recovery signal based on the beam failure instance counter reaching the first value.

2. The method of claim 1, wherein the determining that the downlink signal is transmitted is due to the one or more downlink listen before talk procedures indicating a clear channel.

3. The method of claim 1, wherein the downlink signal comprises a synchronization signal block.

4. The method of claim 1, wherein the downlink signal comprises a channel state information reference signal.

5. The method of claim 1, wherein the determining that the downlink signal is transmitted is based on one or more second threshold values.

6. The method of claim 1, wherein the determining that the downlink signal is transmitted is based on the downlink signal being present in the radio resource.

7. The method of claim 1, further comprising starting a beam failure recovery timer, with a second value, based on the beam failure instance counter having the first value.

8. The method of claim 7, wherein the configuration parameters indicate the second value.

9. The method of claim 1, further comprising starting a beam failure detection timer, with a third value, based on the determining the beam failure instance.

10. The method of claim 1, wherein the beam failure recovery signal is a random access preamble.

11. A wireless device comprising:
one or more processors; and
memory storing instructions that, when executed by the one or more processors, cause the wireless device to:
  receive configuration parameters indicating:
    a first value of a beam failure instance counter; and a radio resource of a downlink signal;
  determine the downlink signal is transmitted via the radio resource based on one or more downlink listen before talk procedures for transmission of the downlink signal being successful in response to a received power of the downlink signal exceeding a first threshold value;
  determine a beam failure instance based on:
    determining the downlink signal is transmitted; and
    the received power of the downlink signal being less than a threshold value;
  increment the beam failure instance counter based on determining the beam failure instance; and
  transmit a beam failure recovery signal based on the beam failure instance counter reaching the first value.

12. The wireless device of claim 11, wherein the determining that the downlink signal is transmitted is due to one or more downlink listen before talk procedures indicating a clear channel.

13. The wireless device of claim 11, wherein the downlink signal comprises a synchronization signal block.

14. The wireless device of claim 11, wherein the downlink signal comprises a channel state information reference signal.

15. The wireless device of claim 11, wherein the determining that the downlink signal is transmitted is based on one or more second threshold values.

16. The wireless device of claim 11, wherein the determining that the downlink signal is transmitted is based on the downlink signal being present in the radio resource.

17. The wireless device of claim 11, wherein the instructions, when executed by the one or more processors, further cause the wireless device to start a beam failure recovery timer, with a second value, based on the beam failure instance counter having the first value.

18. The wireless device of claim 17, wherein the configuration parameters indicate the second value.

19. The wireless device of claim 11, wherein the instructions, when executed by the one or more processors, further cause the wireless device to start a beam failure detection timer, with a third value, based on the determining the beam failure instance.

20. A system comprising: a base station; and
a wireless device comprising one or more processors and memory storing instructions that, when executed by the one or more processors, cause the wireless device to:
  receive, from the base station, configuration parameters indicating:
    a first value of a beam failure instance counter; and
    a radio resource of a downlink signal;
  determine the downlink signal is transmitted via the radio resource based on one or more downlink listen before talk procedures for transmission of the downlink signal being successful in response to a received power of the downlink signal exceeding a first threshold value;
  determine a beam failure instance based on:
    determining the downlink signal is transmitted; and
    the received power of the downlink signal being less than a threshold value;
  increment the beam failure instance counter based on determining the beam failure instance; and
  transmit a beam failure recovery signal based on the beam failure instance counter reaching the first value.

* * * * *